US012508807B2

(12) United States Patent
Mine

(10) Patent No.: US 12,508,807 B2
(45) Date of Patent: Dec. 30, 2025

(54) HEAD CHIP, LIQUID JET HEAD, LIQUID JET RECORDING DEVICE, AND METHOD OF MANUFACTURING HEAD CHIP

(71) Applicant: SII Printek Inc., Chiba (JP)

(72) Inventor: Tooru Mine, Chiba (JP)

(73) Assignee: SII PRINTEK INC., Chiba (JP)

( * ) Notice: Subject to any disclaimer, the term of this patent is extended or adjusted under 35 U.S.C. 154(b) by 158 days.

(21) Appl. No.: 18/462,826

(22) Filed: Sep. 7, 2023

(65) Prior Publication Data

US 2024/0083168 A1 Mar. 14, 2024

(30) Foreign Application Priority Data

Sep. 12, 2022 (JP) ................................ 2022-144270

(51) Int. Cl.
*B41J 2/14* (2006.01)

(52) U.S. Cl.
CPC ....... *B41J 2/14209* (2013.01); *B41J 2/14201* (2013.01); *B41J 2002/14491* (2013.01); *B41J 2202/10* (2013.01); *B41J 2202/12* (2013.01)

(58) Field of Classification Search
CPC ................ B41J 2/14209; B41J 2/14201; B41J 2002/14491; B41J 2202/10; B41J 2202/12
See application file for complete search history.

(56) References Cited

U.S. PATENT DOCUMENTS

2002/0047878 A1* 4/2002 Akanabe ................ B41J 2/1642 347/68
2020/0180311 A1 6/2020 Nakayama
2021/0187950 A1 6/2021 Munakata et al.

FOREIGN PATENT DOCUMENTS

JP 2000-108361 A 4/2000
JP 2021-098333 A 7/2021

OTHER PUBLICATIONS

Extended European Search Report in Europe Application No. 23196740.7, dated Jan. 29, 2024, 7 pages.

* cited by examiner

*Primary Examiner* — Geoffrey S Mruk
(74) *Attorney, Agent, or Firm* — Crowell & Moring LLP

(57) ABSTRACT

There are provided a head chip, a liquid jet head, a liquid jet recording device, and a method of manufacturing a head chip each capable of ensuring an inter-electrode distance of each of channels while achieving narrowing of a pitch of the channels. In the head chip according to an aspect of the present disclosure, an electrical conducting material removal area in which laser irradiation scars are formed throughout an entire area in an X direction of a portion located between a lower end opening of an ejection channel and a lower end opening of a non-ejection channel is disposed in a portion located between the lower end opening of the ejection channel and the lower end opening of the non-ejection channel in a lower surface of an actuator plate.

8 Claims, 30 Drawing Sheets

HEAD CHIP, LIQUID JET HEAD, LIQUID JET RECORDING DEVICE, AND METHOD OF MANUFACTURING HEAD CHIP

RELATED APPLICATIONS

This application claims priority to Japanese Patent application No. JP2022-144270, filed on Sep. 12, 2022, the entire content of which is incorporated herein by reference.

BACKGROUND OF THE INVENTION

1. Field of the Invention

The present disclosure relates to a head chip, a liquid jet head, a liquid jet recording device, and a method of manufacturing a head chip.

2. Description of the Related Art

An inkjet head to be installed in an inkjet printer ejects ink to a recording target medium through a head chip installed in the inkjet head. The head chip is provided with an actuator plate having ejection channels and non-ejection channels, and a nozzle plate having nozzle holes communicated with the ejection channels. The ejection channels and the non-ejection channels are alternately arranged across respective drive walls.

In the head chip, in order to eject the ink, a voltage is applied between electrodes provided to the drive wall to cause the drive wall to make a thickness-shear deformation. Thus, due to a change in volume of the ejection channel, the ink in the ejection channel is ejected through a nozzle hole.

The electrodes described above are formed by introducing an electrical conducting material into each of the channels through an opening on a principal surface of an actuator plate in each of the channels. In, for example, JP-A-2021-98333, there has been known a configuration in which the electrical conducting material is deposited, and then the electrical conducting material adhering on the principal surface of the actuator plate is removed by laser irradiation to thereby decouple the electrodes of the respective channels from each other.

Incidentally, in recent years, in order to cope with the requirement such as an achievement of high resolution, it is necessary to narrow the pitch of the channels.

However, due to the narrowing of the pitch of the cannels, the dimension of the drive wall decreases. On this occasion, in the related art, there still exists room for improvement in the point that the inter-electrode distance of each of the channels is ensured while achieving the narrowing of the pitch of the channels.

The present disclosure provides a head chip, a liquid jet head, a liquid jet recording device, and a method of manufacturing a head chip each capable of ensuring the inter-electrode distance of each of the channels while achieving the narrowing of the pitch of the channels.

SUMMARY OF THE INVENTION

In view of the problems described above, the present disclosure adopts the following aspects.

(1) A head chip according to an aspect of the present disclosure includes an actuator plate in which jet channels to be filled with liquid and non jet channels not to be filled with the liquid each extend in a first direction, and are alternately formed in a second direction crossing the first direction across each of drive walls, a first electrode formed on an inner surface of the jet channel, and a second electrode formed on an inner surface of the non jet channel, wherein in the actuator plate, on a first principal surface facing to one side in a third direction crossing the second direction when viewed from the first direction, in a portion located between a first opening which opens on the first principal surface in the jet channel and a second opening which opens on the first principal surface in the non-jet channel, an electrical conducting material removal area in which a laser irradiation scar is formed throughout an entire area in the second direction between the first opening and the second opening is disposed.

According to the present aspect, when depositing the electrical conducting material from the first principal surface side of the actuator plate in forming the electrodes in each of the channels, by removing the electrical conducting material adhering on the first principal surface with the laser irradiation, it is possible to decouple the first electrode and the second electrode adjacent to each other on the first principal surface. In this case, by disposing the electrical conducting material removal area throughout the entire area in the second direction between the first opening and the second opening, it is easy to ensure the inter-electrode distance between the first electrode and the second electrode adjacent to each other. Therefore, it is possible to provide the head chip which prevents the occurrence of the short circuit caused by the first electrode and the second electrode being bridged with the liquid while shortening the distance (pitch) between the channels adjacent to each other, and which is excellent in reliability and durability.

(2) In the head chip according to the aspect (1) described above, it is preferable that the electrical conducting material removal area is formed in at least a portion located between a central portion in the first direction of the jet channel and a central portion in the first direction of the non jet channel on the first principal surface, in the first principal surface, in a circumferential edge portion located in a first side end portion in the first direction in the first opening, a first wiring part to be coupled to the first electrode through the first opening is formed, and the first wiring part includes a pair of first lateral connection parts arranged at both sides in the second direction with respect to the first opening, and a terminal part which couples the pair of first lateral connection parts to each other, and which is coupled to external wiring.

According to the present aspect, since it is possible to ensure the conduction between the first electrode and the first wiring part with the first lateral connection part, it is possible to ensure the inter-electrode distance at least between the central portion in the first direction of the jet channel and the central portion in the first direction of the non jet channel while ensuring the electrical reliability between the first electrode and the first wiring part.

(3) In the head chip according to the aspect (2) described above, it is preferable that the first electrode includes a side surface part formed on inner side surfaces opposed to each other in the second direction in the jet channel, the jet channel includes an uprise part gradually decreasing in dimension in the first direction toward one side in the third direction when viewed from the second direction, and the first wiring part is coupled to the side surface part via the first lateral connection part.

The uprise part and the first principal surface are apt to form an acute angle in a portion connected to the uprise part in the opening edge of the jet channel. When depositing the electrical conducting material from the first principal surface side in this state, it is difficult to deposit the first electrode on the uprise part in the desired condition.

Therefore, according to the present aspect, by ensuring the conduction between the first electrode and the first wiring part between the first lateral connection part and the side surface part, it is possible to ensure the electrical reliability between the first electrode and the first wiring part.

(4) In the head chip according to the aspect (2) or (3) described above, it is preferable that a first side end portion of the jet channel includes a decreasing part decreasing in distance between inner side surfaces opposed to each other in the second direction in a direction toward the first opening when viewed from the first direction, and a uniform part which is connected at a second side as an opposite side to a first side in the first direction to the decreasing part, and which is uniform in distance between inner side surfaces opposed to each other in the second direction, and the first lateral connection part extends to a position overlapping the uniform part in the first direction, and is coupled to a portion provided to the uniform part in the first electrode.

The decreasing part and the first principal surface of the portion connected to the decreasing part are apt to form an acute angle in the opening edge of the jet channel. When depositing the electrical conducting material from the first principal surface side in this state, it is difficult to deposit the first electrode on the decreasing part in the desired condition.

Therefore, in the present aspect, by extending the first lateral connection part to the position overlapping the uniform part in the first direction, it is possible to connect the first lateral connection part to the first electrode provided to the uniform part. As a result, it is possible to ensure the electrical reliability between the first electrode and the first wiring part.

(5) In the head chip according to any one of the aspects (2) to (4) described above, it is preferable that in the first principal surface, in a circumferential edge portion located in a second side end portion in the first direction in the first opening, a second wiring part to be coupled to the first electrode through the first opening is formed, and the second wiring part includes a pair of second lateral connection parts arranged at both sides in the second direction with respect to the first opening, and a central connection part configured to connect the pair of second lateral connection parts to each other.

According to the present aspect, even when a broken line supposedly occurs between one of the first electrodes and the first lateral connection part corresponding to the one of the first electrodes, since the second wiring part and both of the first electrodes are coupled to each other, the conduction between both of the first electrodes and the first wiring part can be ensured via the second wiring part. Thus, it is possible to improve the operation reliability and the durability of the head chip.

(6) In the head chip according to any one of the aspects (1) to (5) described above, it is preferable that a bonding member is bonded to the first principal surface via an adhesive, and a first bonding film which is higher in bonding force with the first principal surface compared to a bonding force between the first principal surface and the adhesive intervenes between the first principal surface and the adhesive.

According to the present aspect, it is possible to ensure an area where the actuator plate is exposed in the first principal surface due to the electrical conducting material removal area. Moreover, since in the present aspect, the adhesive is formed on the first principal surface via the first bonding film high in bonding force with the first principal surface, it is possible to ensure the bonding strength between the first principal surface and the adhesive. In particular, in the electrical conducting material removal area, there is formed fine asperity with the laser irradiation scars. Therefore, it is possible to ensure the physical bonding force between the first bonding film and the first principal surface of the actuator plate due to a so-called anchor effect, and thus, it is possible to stably form the first bonding film on the first principal surface.

(7) In the head chip according to any one of the aspects (1) to (5) described above, it is preferable to further include a protective film which has insulating property and which is disposed so as to cover the first principal surface, wherein it is preferable for a second bonding film which is higher in bonding force with the first principal surface compared to a bonding force between the first principal surface and the protective film to intervene between the first principal surface and the protective film.

According to the present aspect, by forming the protective film on the first principal surface via the second bonding film, it is possible to stably dispose the protective film on the first principal surface. Thus, it is possible to prevent lift or separation of the protective film to protect the electrodes. In particular, in the electrical conducting material removal area, there is formed fine asperity with the laser irradiation scars. Therefore, it is possible to ensure the physical bonding force between the second bonding film and the first principal surface of the actuator plate due to a so-called anchor effect, and thus, it is possible to stably form the second bonding film on the first principal surface.

(8) A liquid jet head according to the present disclosure includes the head chip according to any one of the aspects (1) to (7) described above.

According to the present aspect, it is possible to provide a liquid jet head excellent in reliability and durability.

(9) The liquid jet recording device according to the present disclosure includes the liquid jet head according to the aspect (8) described above.

According to the present aspect, it is possible to provide a liquid jet recording device excellent in reliability and durability.

(10) A method of manufacturing a head chip according to an aspect of the present disclosure is a method of manufacturing a head chip including an actuator plate in which jet channels to be filled with liquid and non jet channels not to be filled with the liquid each extend in a first direction, and are alternately formed in a second direction crossing the first direction across each of drive walls, a first electrode formed on an inner surface of the jet channel, and a second electrode formed on an inner surface of the non jet channel, the method including a deposition step of depositing an electrical conducting material on a first principal surface facing to one side in a third direction crossing the second direction when viewed from the first direction in an actuator plate, an inner surface of the jet channel, and an inner surface of the non jet channel in the actuator plate from the one side in the third direction with respect to the actuator plate, and an electrical conducting material removal step of removing the electrical conducting material formed on the first principal surface by performing laser irradiation throughout an entire area in the second direction between a first opening which opens on the first principal surface in the jet channel and a second opening which opens on the first principal surface in the non-jet channel to a portion located between the first opening and the second opening in the first principal surface.

According to an aspect of the present disclosure, it is possible to ensure the inter-electrode distance between the channels while achieving the narrowing of the pitch of the channels.

DETAILED DESCRIPTION OF THE PREFERRED EMBODIMENTS

Figure 1:
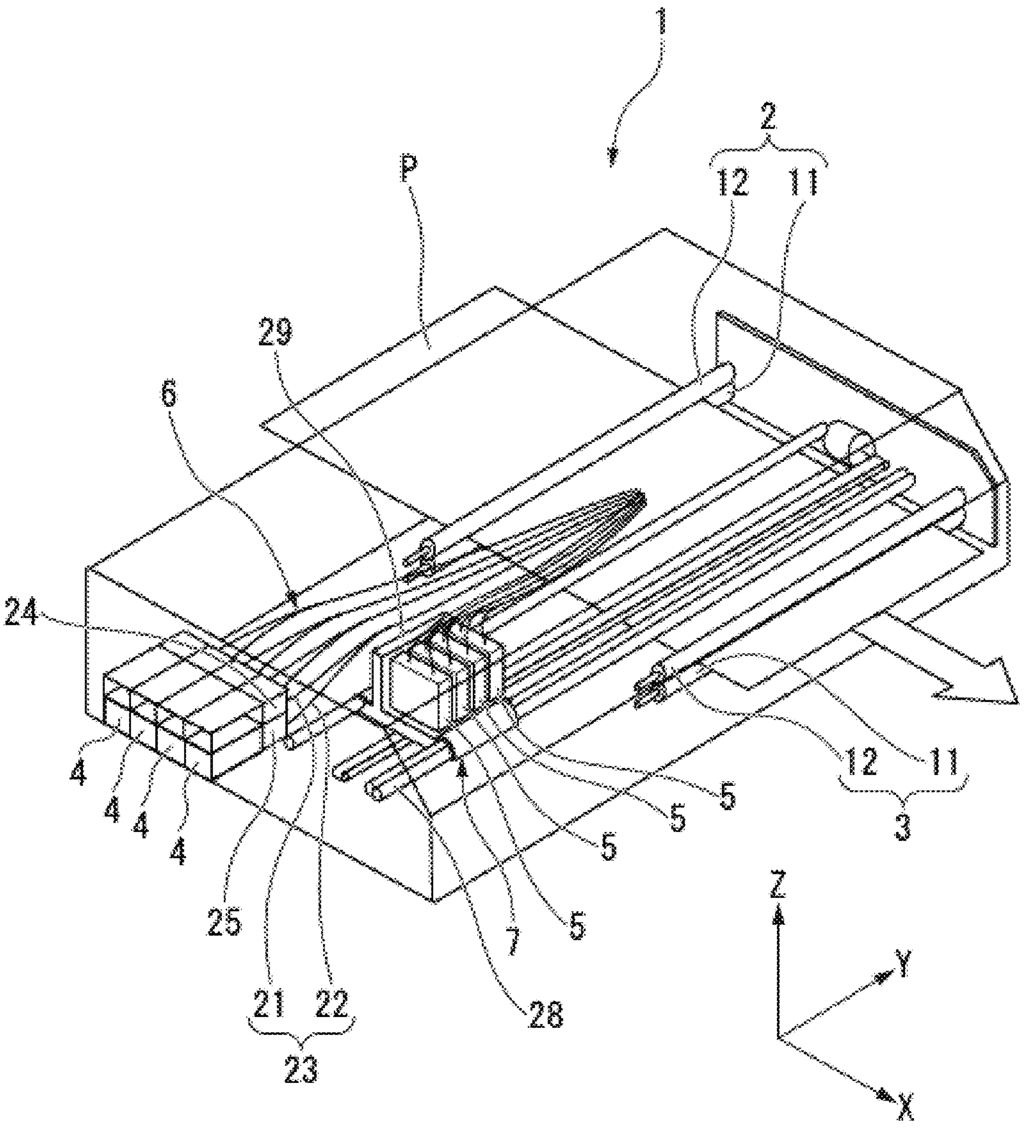
FIG. 1 is a schematic configuration diagram of a printer according to a first embodiment.

An embodiment according to the present disclosure will hereinafter be described with reference to the drawings. In the embodiment and a modified example described hereinafter, constituents corresponding to each other are denoted by the same reference symbols, and the description thereof will be omitted in some cases. In the following description, expressions representing relative or absolute arrangements such as "parallel," "perpendicular," "center," and "coaxial" not only represent strictly such arrangements, but also represent the state of being relatively displaced with a tolerance, or an angle or a distance to the extent that the same function can be obtained. In the following embodiments, the description will be presented citing an inkjet printer (hereinafter simply referred to as a printer) for performing recording on a recording target medium using ink (liquid) as an example. The scale size of each member is arbitrarily modified so as to provide a recognizable size to the member in the drawings used in the following description.

First Embodiment

[Printer 1]

FIG. 1 is a schematic configuration diagram of a printer 1.

As shown in FIG. 1, the printer (a liquid jet recording device) 1 according to a first embodiment is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction coincides with a conveying direction (a sub-scanning direction) of a recording target medium P (e.g., paper). A Y direction coincides with a scanning direction (a main scanning direction) of the scanning mechanism 7. A Z direction represents a height direction (a gravitational direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the first embodiment, the +Z side corresponds to an upper side in the gravitational direction, and the −Z side corresponds to a lower side in the gravitational direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively contain ink of four colors such as yellow, magenta, cyan, and black. The inkjet heads 5 are configured so as to be able to respectively eject the four colors of ink, namely the yellow ink, the magenta ink, the cyan ink, and the black ink in accordance with the ink tanks 4 coupled thereto. It should be noted that water-based ink (electrically-conductive ink) using water as a solvent can be used as the ink contained in the ink tanks 4.

Figure 2:
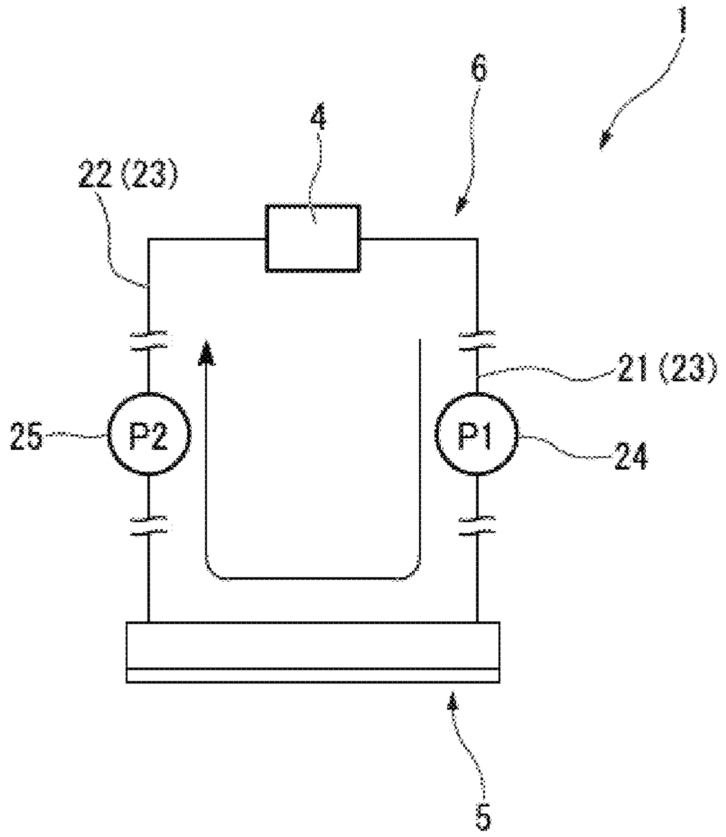
FIG. 2 is a schematic configuration diagram of an inkjet head and an ink circulation mechanism according to the first embodiment.

FIG. 2 is a schematic configuration diagram of the inkjet head 5 and the ink circulation mechanism 6.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes an inside of the ink supply tube 21 to deliver the ink to the inkjet head 5 through the ink supply tube 21. Thus, the ink supply tube 21 is provided with positive pressure with respect to the ink jet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the ink jet head 5. It is arranged that the ink can circulate between the inkjet head 5 and the ink tank 4 through the circulation flow channel 23 by driving the pressure pump 24 and the suction pump 25.

The scanning mechanism 7 makes the inkjet heads 5 perform reciprocal scan in the Y direction. The scanning mechanism 7 is provided with a guide rail 28 extending in the Y direction, and a carriage 29 movably supported by the guide rail 28.

<Inkjet Heads 5>

As shown in FIG. 1, the inkjet heads 5 are mounted on the carriage 29. In the illustrated example, the plurality of inkjet heads 5 are mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a controller (not shown) for applying a drive voltage to the head chip 50.

<Head Chip 50>

Figure 3:
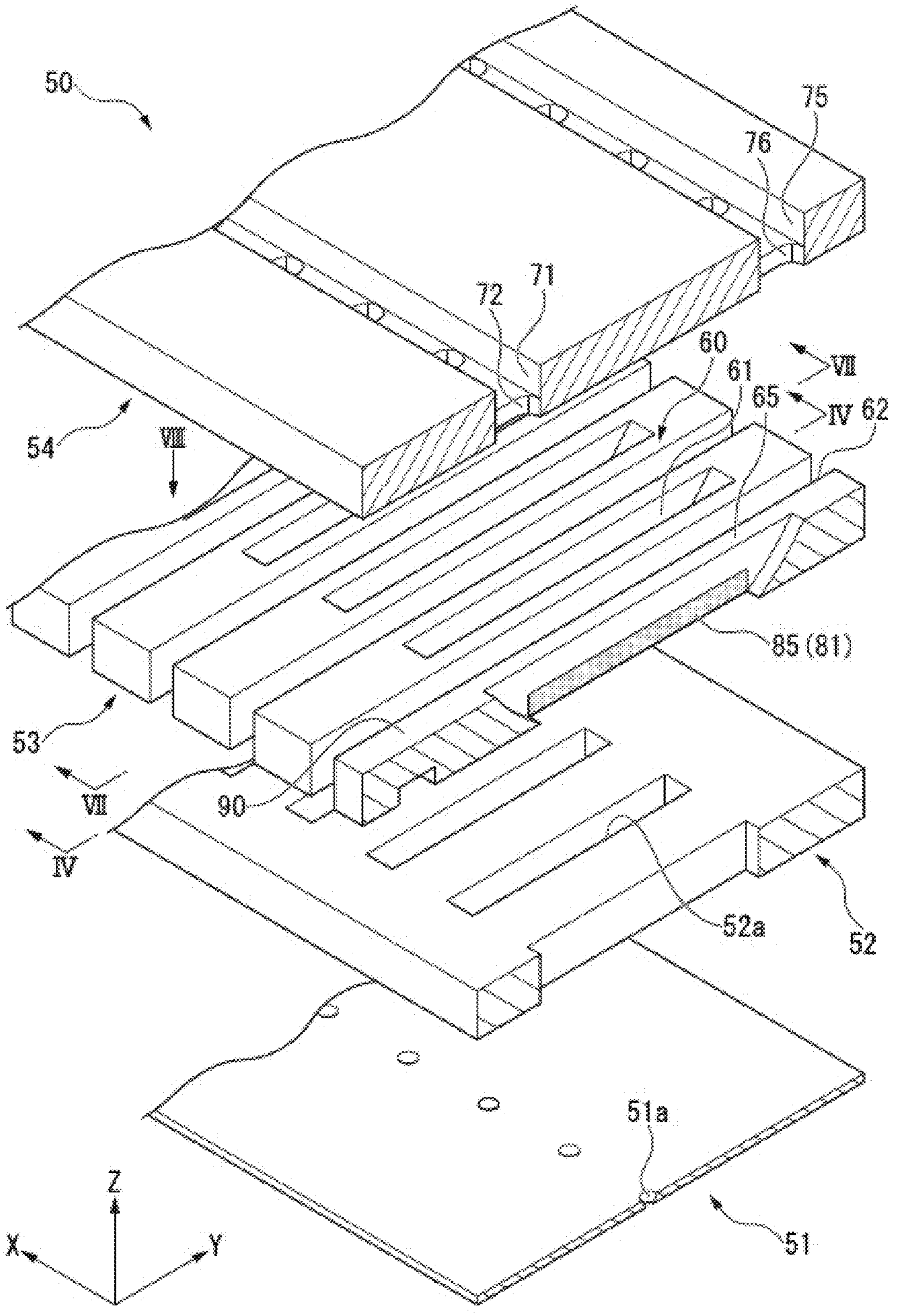
FIG. 3 is an exploded perspective view of a head chip according to the first embodiment.

FIG. 3 is an exploded perspective view of the head chip 50.

The head chip 50 shown in FIG. 3 is a so-called recirculating side-shoot type head chip 50 for ejecting the ink from a central portion in the extending direction (the Y direction) in the ejection channel 61 described later. The head chip 50 is provided with a nozzle plate 51, an intermediate plate (a bonding member) 52, an actuator plate 53, and a cover plate 54. The head chip 50 is provided with a configuration in which the nozzle plate 51, the intermediate plate 52, the actuator plate 53, and the cover plate 54 are stacked on one another in this order in the Z direction (a third direction).

The actuator plate 53 is formed of, for example, PZT (lead zirconate titanate) as a piezoelectric material including an oxide. The actuator plate 53 is a so-called monopole substrate in which the polarization direction is set to a single direction in, for example, the Z direction. It should be noted that the actuator plate 53 can be a so-called chevron substrate in which the polarization direction is different between the positive side and the negative side in the Z direction.

The actuator plate 53 is provided with a channel column 60. The channel column 60 includes ejection channels 61 filled with the ink, and non-ejection channels 62 not filled with the ink. The channels 61, 62 are alternately arranged at intervals in the X direction (a second direction) in the actuator plate 53. The configuration in which the channel extension direction (a first direction) coincides with the Y direction will be described in the first embodiment, but the channel extension direction can cross the Y direction.

Figure 4:
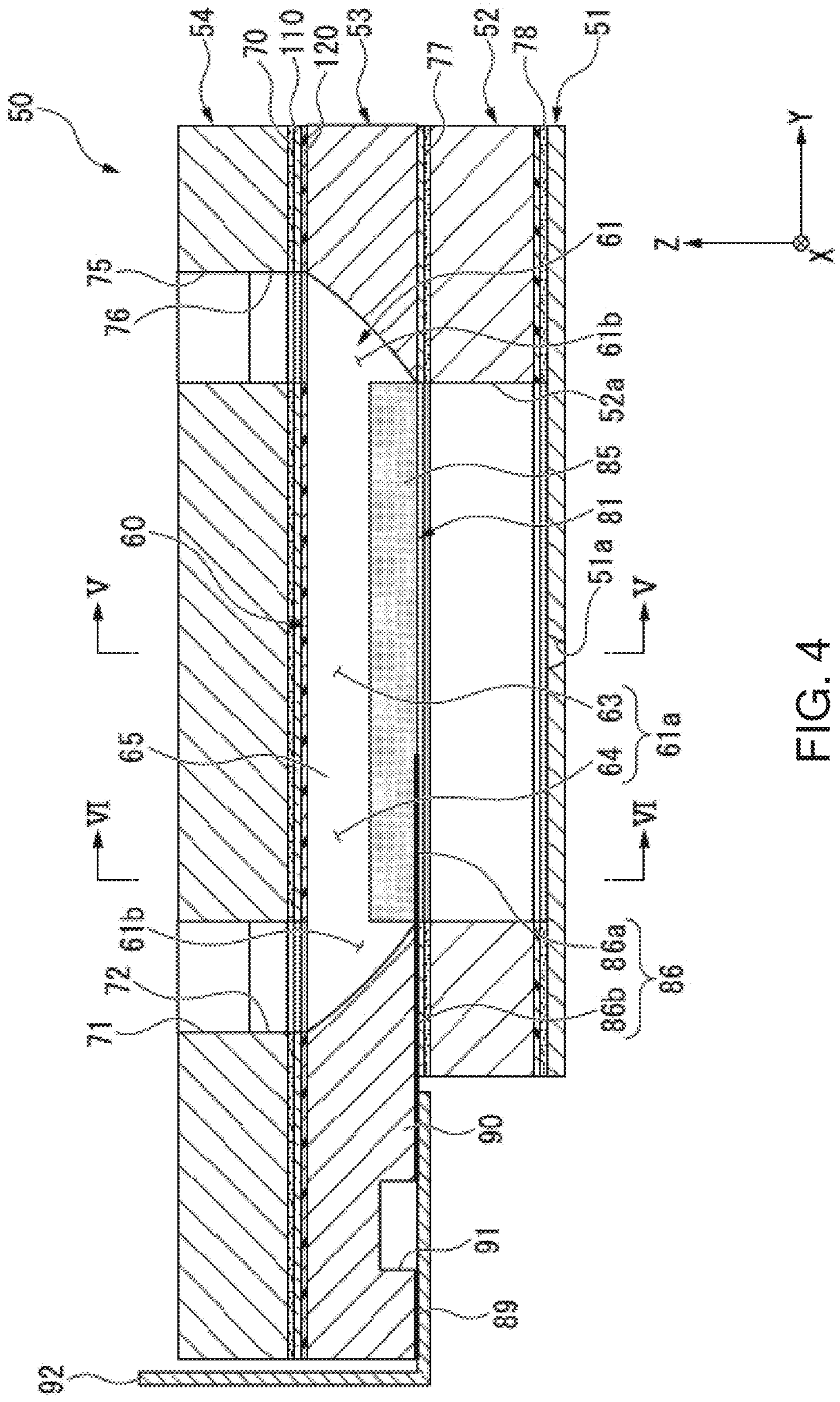
FIG. 4 is a cross-sectional view corresponding to the line IV-IV shown in FIG. 3.

FIG. 4 is a cross-sectional view corresponding to the line IV-IV shown in FIG. 3.

As shown in FIG. 4, the ejection channel 61 is formed to have a circular arc shape convex downward (one direction in the third direction) when viewed from the X direction. In other words, a dimension in the Y direction in the ejection channel 61 gradually decreases in a direction from the upper side toward the lower side. Specifically, the ejection channel 61 is provided with a penetration part **61*a* located in a central portion in the Y direction, and uprise parts 61*b* connected to both sides in the Y direction to the penetration part 61*a***.

Figure 5:
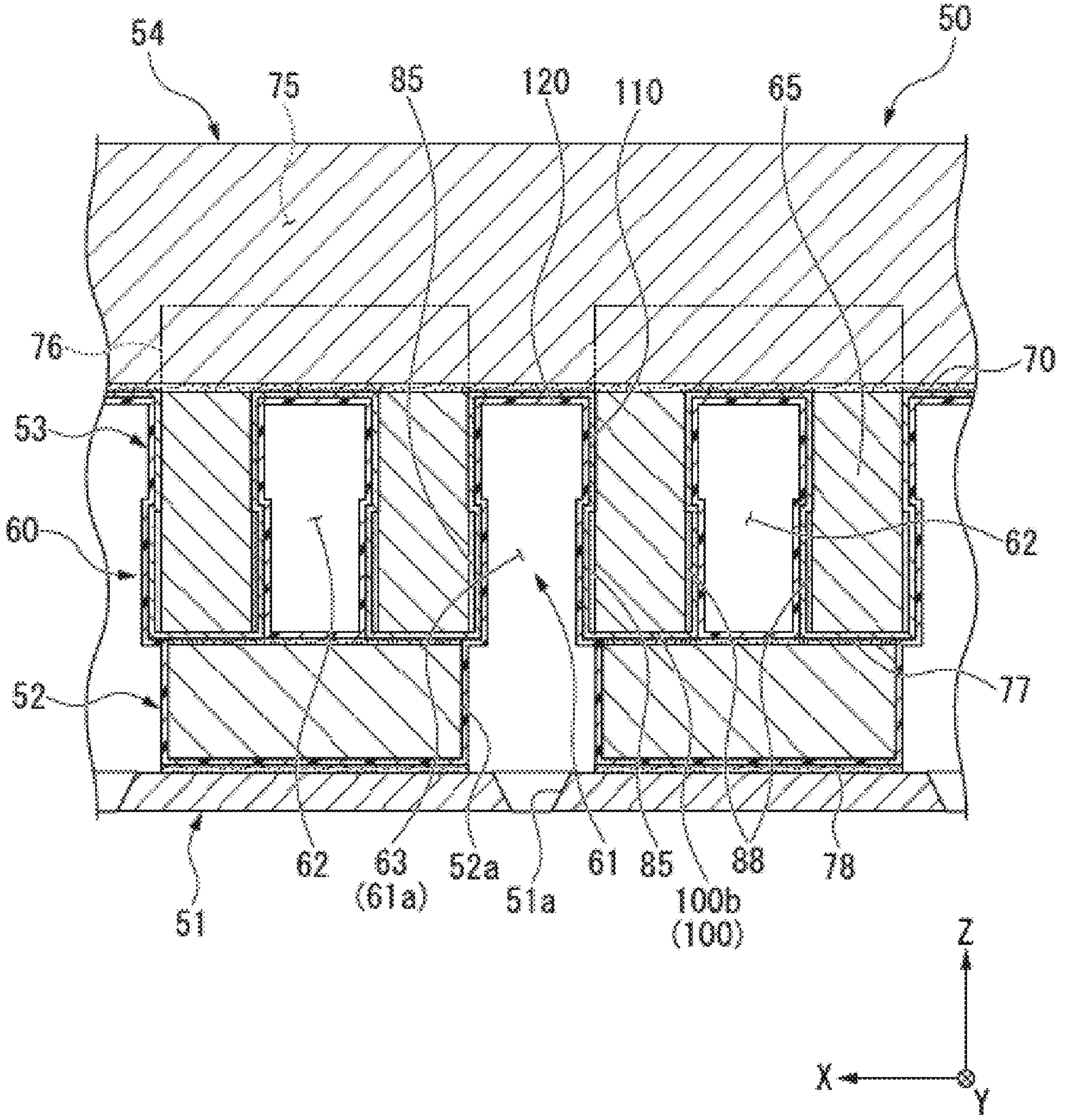
FIG. 5 is a cross-sectional view corresponding to the line V-V shown in FIG. 3.

FIG. 5 is a cross-sectional view corresponding to the line V-V shown in FIG. 4.

As shown in FIG. 4 and FIG. 5, the penetration part **61*a* penetrates the actuator plate 53 in the Z direction. As shown in FIG. 5, an intermediate area in the Y direction in the penetration part 61*a* forms a uniform part 63** which is uniform in dimension in the X direction throughout the whole length in the Z direction.

Figure 6:
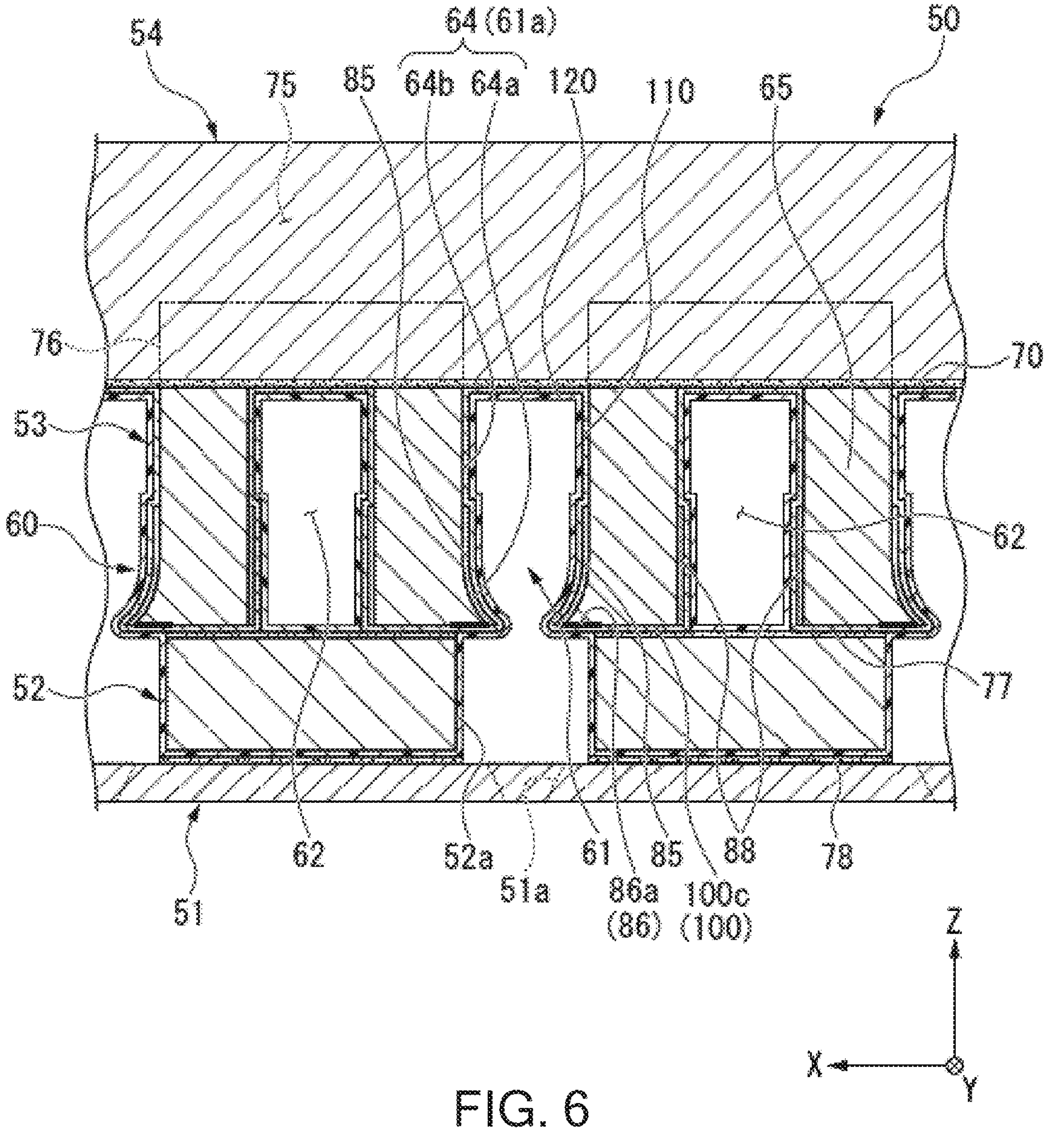
FIG. 6 is a cross-sectional view corresponding to the line VI-VI shown in FIG. 4.

FIG. 6 is a cross-sectional view corresponding to the line VI-VI shown in FIG. 4.

As shown in FIG. 6, in the penetration part **61*a*, portions located at both sides in the Y direction with respect to the uniform part 63 each form a changing part 64. The changing part 64 is provided with a decreasing part 64*a* constituting a lower end portion, and a straight portion 64*b* contiguous above the decreasing part 64*a***.

The decreasing part **64*a* gradually decreases in dimension in the X direction (a distance between inner side surfaces of the ejection channel 61) in a direction from the upper side toward the lower side. A lower end of the decreasing part 64*a* opens on a lower surface (a first principal surface) of the actuator plate 53**.

The straight portion **64*b* extends upward from an upper end of the decreasing part 64*a*. The straight portion 64*b* is formed so that the dimension in the X direction is uniform throughout the whole length in the Z direction. It should be noted that it is possible to arbitrarily change the dimension in the Y direction of the changing part 64 to the whole of the penetration part 61*a*. Further, the penetration part 61*a* can be provided with a configuration in which the changing part 64 (the decreasing part 64*a***) is not provided.

As shown in FIG. 4, the uprise parts **61*b* each open on the upper surface of the actuator plate 53, and at the same time, the dimension in the Z direction of the uprise parts 61*b* gradually decreases as getting away in the Y direction from the penetration part 61*a*. In other words, an upper end opening of the ejection channel 61 is formed of the penetration part 61*a* and the uprise part 61*b*. In contrast, a lower end opening of the ejection channel 61 is formed of the penetration part 61*a*. It should be noted that a bottom surface of the uprise part 61*b*** is formed to have a circular arc shape uniform in curvature radius.

Figure 7:
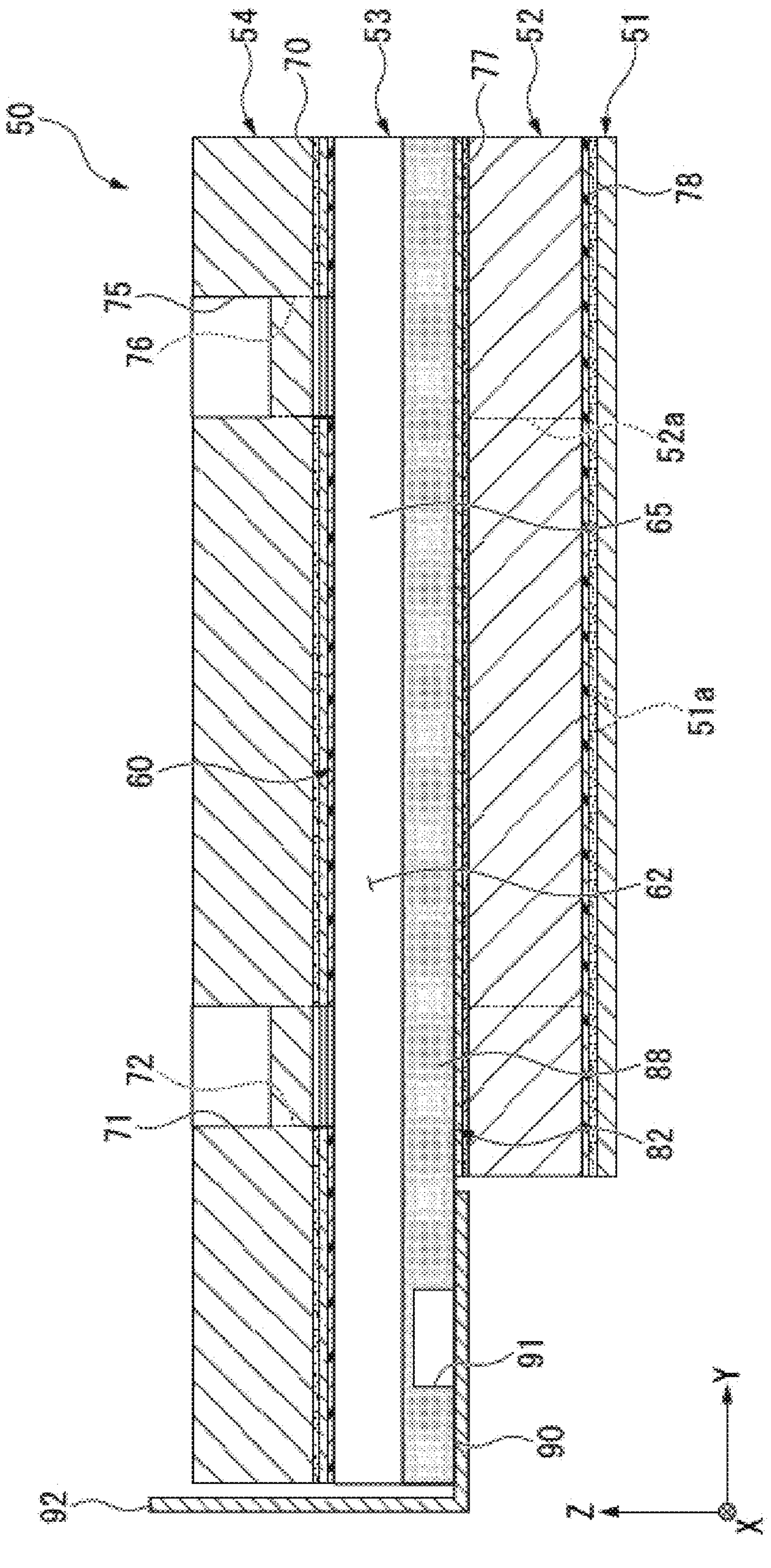
FIG. 7 is a cross-sectional view corresponding to the line VII-VII shown in FIG. 3.

FIG. 7 is a cross-sectional view corresponding to the line VII-VII shown in FIG. 3.

As shown in FIG. 7, the non-ejection channel 62 linearly extends in the Y direction in the state of penetrating the actuator plate 53 in the Z direction. As shown in FIG. 3, in the actuator plate 53, a portion located between each of the ejection channel 61 and corresponding one of the non-ejection channels 62 constitutes a drive wall 65. Therefore, both sides in the X direction of each of the channels 61, 62 are surrounded by the pair of drive walls 65. In the first embodiment, although the description is presented citing the head chip 50 having the single channel column 60 as an example, it is possible to dispose a plurality of channel columns 60 in the Y direction. On this occasion, it is preferable for the ejection channels 61 constituting the channel columns 60 adjacent to each other to be arranged so as to be shifted as much as 1/n pitch with respect to an arrangement pitch of the ejection channels 61 in one of the channel columns 60 assuming the number of the channel columns 60 as n.

As shown in FIG. 3 and FIG. 5, the cover plate 54 is bonded to an upper surface of the actuator plate 53 via an adhesive 70 so as to cover the upper end openings of the channels 61, 62. As the adhesive 70, there is used, for example, an epoxy adhesive.

As shown in FIG. 4, in the cover plate 54, at a position overlapping the −Y-side end portion of the channel column 60 in the plan view, there is formed an entrance common ink chamber 71. The entrance common ink chamber 71 extends in the X direction with a length sufficient for straddling, for example, the channel columns 60, and at the same time, opens on the upper surface of the cover plate 54.

In the entrance common ink chamber 71, at the positions overlapping the respective ejection channels 61 in the plan view, there are formed entrance slits 72. The entrance slits 72 each communicate the −Y-side end portion of corresponding one of the ejection channels 61 and the entrance common ink chamber 71 with each other.

In the cover plate 54, at a position overlapping the +Y-side end portion of the channel column 60 in the plan view, there is formed an exit common ink chamber 75. The exit common ink chamber 75 extends in the X direction with a length sufficient for straddling, for example, the channel columns 60, and at the same time, opens on the upper surface of the cover plate 54.

In the exit common ink chamber 75, at the positions overlapping the respective non-ejection channels 62 in the plan view, there are formed exit slits 76. The exit slits 76 each communicate the +Y-side end portion of corresponding one of the ejection channels 61 and the exit common ink chamber 75 with each other. Therefore, the entrance slits 72 and the exit slits 76 are communicated with the respective ejection channels 61 on the one hand, but are not communicated with the non-ejection channels 62 on the other hand.

As shown in FIG. 5, the intermediate plate 52 is bonded to the lower surface of the actuator plate 53 via an adhesive 77. The intermediate plate 52 is formed of a piezoelectric material such as PZT similarly to the actuator plate 53. It should be noted that the intermediate plate 52 can be formed of a material (e.g., a nonconductive material such as polyimide or alumina) other than the piezoelectric material.

In the intermediate plate 52, at a position overlapping the ejection channel 61 (the penetration part 61*a*) in the plan view, there is formed a communication hole 52*a*. The communication hole 52*a* penetrates the intermediate plate 52 in the Z direction. The communication hole 52*a* is communicated with the ejection channel 61 through the lower-side opening of the ejection channel 61. A dimension in the X direction in the communication hole 52*a* is larger than the dimension in the X direction in the ejection channel 61. It should be noted that the intermediate plate 52 is not an essential constituent.

The nozzle plate 51 is bonded to a lower surface of the intermediate plate 52 via an adhesive 78. The nozzle plate 51 is formed of a metal material (SUS, Ni—Pd, and so on) so as to have a thickness of about 50 μm. It should be noted that it is possible for the nozzle plate 51 to have a single layer structure or a laminate structure with a resin material (polyimide or the like), glass, silicone, or the like besides the metal material.

The nozzle plate 51 is provided with a plurality of nozzle holes 51*a* penetrating the nozzle plate 51 in the Z direction. The nozzle holes 51*a* are each formed to have, for example, a taper shape having the inner diameter gradually decreasing along a direction from the upper side toward the lower side. The nozzle holes 51*a* are arranged at intervals in the X direction. The nozzle holes 51*a* are respectively communicated with the corresponding ejection channels 61 through the communication holes 52*a*. Therefore, the non-ejection channels 62 are not communicated with the nozzle holes 51*a*, but are covered with the nozzle plate 51 from below. It should be noted that it is preferable for the dimension in the X direction in the communication hole 52*a* to be larger than that of a maximum inner diameter part (the upper-side opening) of the nozzle hole 51*a*.

Figure 8:
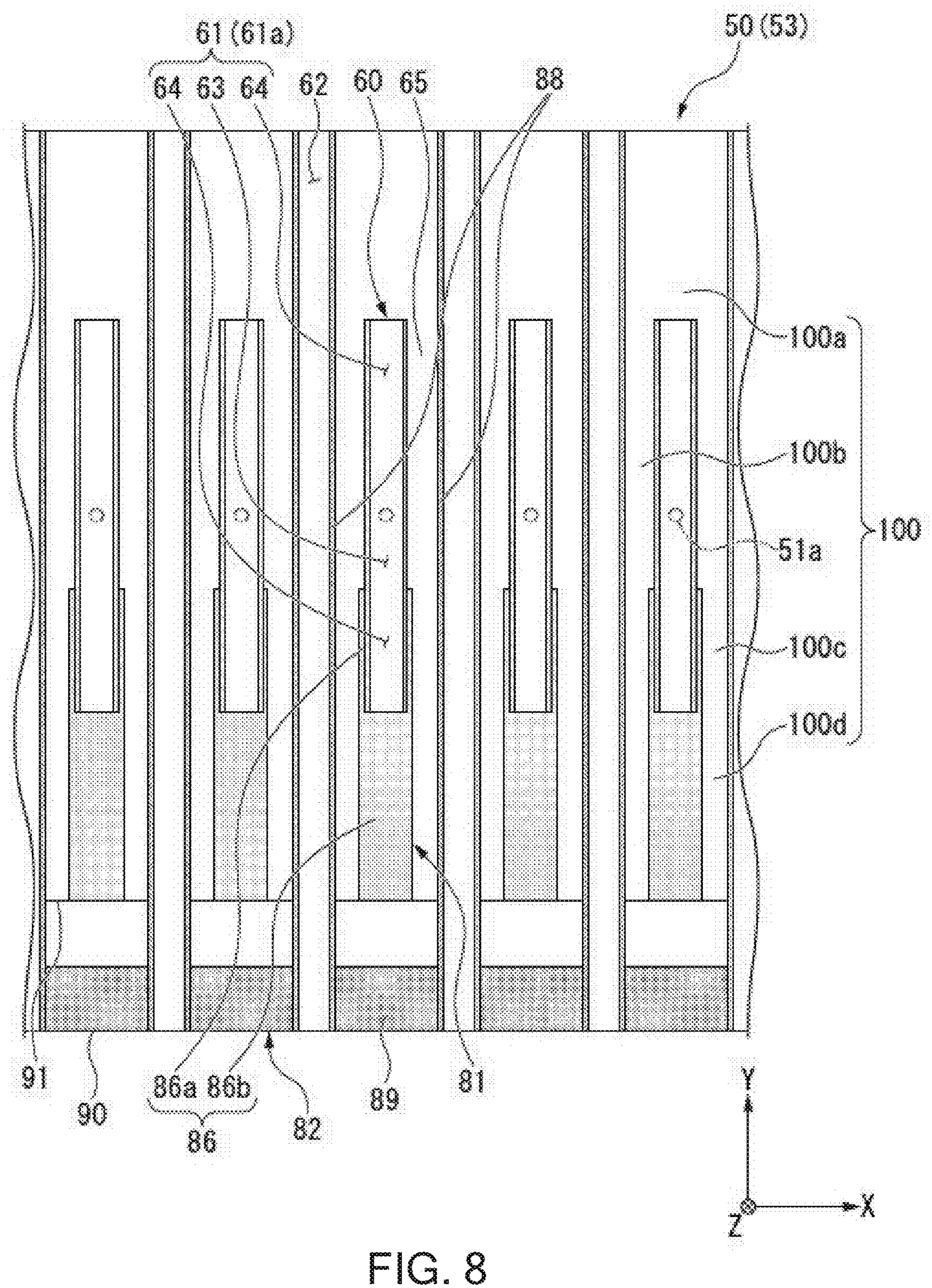
FIG. 8 is a view along the arrow VIII shown in FIG. 3.

Then, drive wiring provided to the actuator plate 53 will be described. FIG. 8 is a view along the arrow VIII shown in FIG. 3.

As shown in FIG. 8, the actuator plate 53 is provided with common wiring 81 and individual wiring 82.

As shown in FIG. 4 and FIG. 8, the common wiring 81 is provided with common electrodes (first electrodes, side surface parts) 85 and a first connection wiring part (a first wiring part) 86.

The common electrodes 85 are formed on the inner side surfaces opposed to each other in the X direction out of the inner surfaces of the ejection channel 61 as a pair of electrodes. The common electrodes 85 are each formed on the inner side surface of the ejection channel 61 (the penetration part 61*a*) in an about lower half area.

The first connection wiring part 86 surrounds a −Y-side end portion (a first-side end portion) in a lower end opening edge of the ejection channel 61 in the lower surface of the actuator plate 53, and connects −Y-side end portions of the pair of common electrodes 85 to each other. The first connection wiring part 86 is provided with extraction parts (first lateral connection parts) 86*a*, and a common terminal (a terminal part) 86*b*.

The extraction parts 86*a* are respectively formed in −Y-side end portions in the lower end opening edge of the ejection channel 61, and at both sides in the X direction. Each of the extraction parts 86*a* extends in a portion from the changing part 64 to the −Y-side end portion of the uniform part 63 in the Y direction along the lower end opening edge of the ejection channel 61. Specifically, the—side end portion in the extraction part 86*a* is arranged at a position equivalent in the Y direction to the −Y-side end edge in the lower end opening edge of the ejection channel 61. The +Y-side end portion in the extraction part 86*a* reaches a position equivalent in the Y direction to the −Y-side end portion in the uniform part 63. The extraction part 86*a* is coupled to a portion provided to the uniform part 63 in the corresponding common electrode 85 through the lower end opening of the ejection channel 61. It should be noted that it is possible for the extraction part 86*a* to be coupled to a portion provided to the changing part 64 (the decreasing part 64*a*) in the common electrode 85. Further, it is possible for the extraction part 86*a* to be terminated at the −Y side with respect to the uniform part 63.

The common terminal 86*b* is formed in a portion (hereinafter referred to as a tail part 90) located at the −Y side of the ejection channel 61 in the lower surface of the actuator plate 53. The common terminal 86*b* is disposed on the lower surface of the tail part 90 so as to correspond to each of the ejection channels 61. The common terminals 86*b* each extend linearly in the Y direction with respect to corresponding one of the ejection channels 61. The +Y-side end portions in the common terminal 86*b* are respectively coupled to the pair of extraction parts 86*a*. In the illustrated example, the +Y-side end portions of the common terminal 86*b* reach the −Y-side end edge in the lower end opening edge of the ejection channel 61. It should be noted that providing the common terminal 86*b* is coupled to the extraction part 86*a*, the common terminal 86*b* is not required to reach the lower end opening edge (the −Y-side end edge) of the ejection channel 61.

As shown in FIG. 7 and FIG. 8, the individual wiring 82 is provided with individual electrodes (second electrodes) 88, and an individual terminal 89.

The individual electrodes 88 are formed on the inner side surfaces opposed to each other in the X direction out of the inner surfaces of each of the non-ejection channels 62. In the illustrated example, the individual electrodes 88 are each formed on the inner side surface of the non-ejection channel 62 in an about lower half area. It should be noted that providing electrical contact between the individual electrodes 88 and the individual terminal 89 is ensured, it is sufficient for the individual electrodes 88 to be formed in an area overlapping at least the common electrodes 85 when viewed from the X direction.

The individual terminal 89 is provided to a portion located at the −Y side of the common terminal 86*b* on the lower surface of the tail part 90. The individual terminal 89 is provided with a strip-like shape extending in the X direction. The individual terminal 89 couples the individual electrodes 88 opposed to each other in the X direction across the ejection channel 61 to each other at the lower end opening edges of the non-ejection channels 62 which are opposed to each other in the X direction across the ejection channel 61. In the tail part 90, a portion located between the common terminal 86*b* and the individual terminal 89 is provided with a partitioning groove 91. The partitioning groove 91 extends in the X direction in the tail part 90. The partitioning groove 91 decouples the common terminal 86*b* and the individual terminal 89 from each other.

To the lower surface of the tail part 90, there is pressure-bonded a flexible printed board 92. The flexible printed board 92 is coupled to the common terminals 86*b* and the individual terminals 89 on the lower surface of the tail part 90. The flexible printed board 92 is extracted upward passing through the outside of the actuator plate 53.

Figure 9:
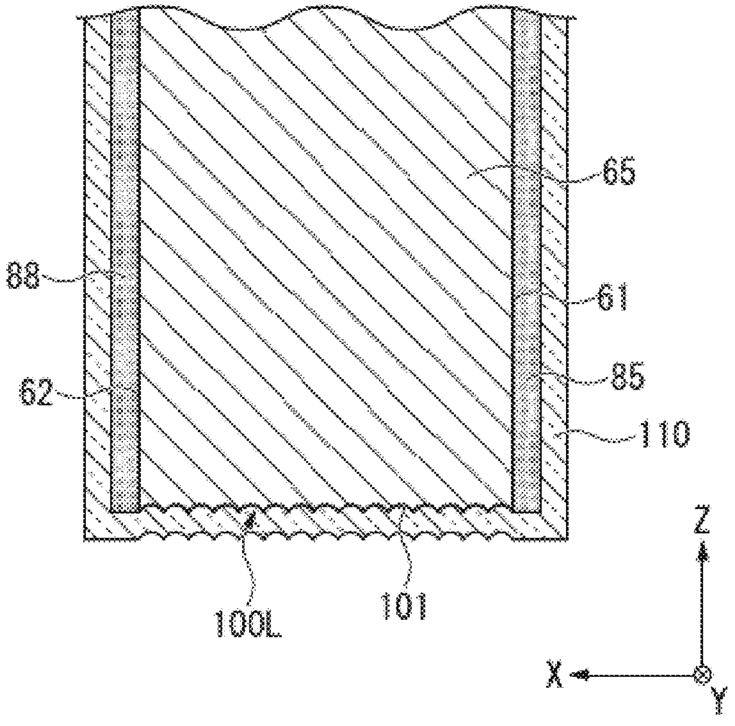
FIG. 9 is an enlarged cross-sectional view of FIG. 5.

FIG. 9 is an enlarged cross-sectional view of FIG. 5.

Here, as shown in FIG. 8 and FIG. 9, on the lower surface of the actuator plate 53, there is disposed a blank area 100 where no electrical conducting material is formed. The blank area 100 is an area obtained by removing the electrical conducting material (a lower surface deposition part 102) adhering to the lower surface of the actuator plate 53 with the laser irradiation in an electrical conducting material removal step S5 described later. Therefore, in the blank area 100, on the lower surface of the actuator plate 53, there is formed a plurality of laser irradiation scars L. In the present embodiment, the laser irradiation scars L are formed so as to extend in one of the X direction and the Y direction, and at the same time, to be arranged in a plurality of columns arranged side by side in the other of the X direction and the Y direction. Further, an inner surface of each of the laser irradiation scars L is formed to have a circular arc shape concave downward in the cross-sectional view along the other of the directions.

The blank area 100 is provided with a first removal area 100*a*, a second removal area (the electrical conducting material removal area) 100*b*, a third removal area 100*c*, and a fourth removal area 100*d*.

The first removal area 100*a* is an area located at the +Y side of the lower end opening of the ejection channel 61 on the lower surface of the actuator plate 53. The first removal area 100*a* is formed throughout the entire area in the X direction in a portion located between the non-ejection channels 62 adjacent to each other on the lower surface of the actuator plate 53. The +Y-side end portion in the first removal area 100*a* reaches the +Y-side end edge of the actuator plate 53. In contrast, the −Y-side end portion of the first removal area 100*a* reaches the +Y-side end edge in the lower end opening edge of the ejection channel 61.

The second removal area 100*b* is connected at the −Y side of the first removal area 100*a*. The second removal area 100*b* is formed throughout the entire area in the X direction in a portion located between a lower end opening (a first opening) of the ejection channel 61 and a lower end opening (a second opening) of the non-ejection channel 62 in an area at the +Y side of the extraction part 86*a*. In other words, in an area (an area from a central portion in the Y direction in the lower end opening of the ejection channel 61 to the +Y-side end portion) at the +Y side of the extraction part 86*a*, in a portion located between the lower end opening of the ejection channel 61 and the lower end opening of the non-ejection channel 62, there is exposed the actuator plate 53 throughout the entire area in the X direction. It should be noted that the central portion in the Y direction in the lower end opening of the ejection channel 61 means an area except the both end portions in the Y direction, and is an area at the +Y side of the extraction part 86*a*, and at the same time, a predetermined area in the Y direction including a portion overlapping the nozzle hole 51*a* in the plan view in the present embodiment.

The third removal area 100*c* is a portion located at both sides in the X direction with respect to the extraction part 86*a* in the area located between the lower end opening of the ejection channel 61 and the lower end opening of the non-ejection channel 62. In the third removal area 100*c*, the electrical conducting material is removed throughout the entire area in the X direction of a portion located between the extraction part 86*a* and the lower end opening of the non-ejection channel 62.

The fourth removal area 100*d* is an area located in the tail part 90 on the lower surface of the actuator plate 53. The fourth removal area 100*d* is connected at the −Y side of the third removal area 100*c*. The fourth removal area 100*d* is formed throughout the entire area in the X direction in a portion located between the common terminal 86*b* and the lower end opening of the non-ejection channel 62. It should be noted that the dimension in the X direction of the blank area 100 can arbitrarily be changed providing the common wiring 81 and the individual wiring 82 are electrically decoupled, and a distance no shorter than a minimum dimension is ensured in the inter-electrode distance between the common wiring 81 and the individual wiring 82. In the first embodiment, the minimum dimension of the inter-electrode distance is set no smaller than a dimension between the extraction part 86*a* and the individual electrode 88.

As shown in FIG. 5 and FIG. 6, the head chip 50 is provided with a processed film (a first bonding film) 110 and a protective film 120.

The processed film 110 is for ensuring a bonding force between the lower surface of the actuator plate 53 and the adhesive 77, and a surface treatment such as a silane coupling treatment is performed on the processed film 110. In the illustrated example, the processed film 110 is formed throughout a portion exposed inside each of the channels 61, 62 on the lower surface of the actuator plate 53, the inner surfaces of the channels 61, 62, and the lower surface of the cover plate 54. It should be noted that the treatment is not limited to the silane coupling treatment providing the material of the processed film 110 is a material which is higher in bonding force with the lower surface of the actuator plate 53 compared to the bonding force between the lower surface of the actuator plate 53 and the adhesive 77.

In the processed film 110, a portion located on the lower surface of the actuator plate 53 intervenes between the lower surface of the actuator plate 53 and the adhesive 77. In the processing film 110, a portion located inside the channels 61, 62 cover each of the common electrodes 85 and the individual electrodes 88. It should be noted that it is sufficient for the processed film 110 to intervene at least on the lower surface of the actuator plate 53 with the adhesive 77.

The protective film 120 intervenes between the ink and the electrodes (mainly the common electrodes 85) to protect the electrodes. In the present embodiment, the protective film 120 is formed so as to cover portions exposed inside the channels 61, 62 in the inner surfaces of the channels 61, 62, the lower surface of the intermediate plate 52, the inner surfaces of the communication holes 52*a*, and the lower surface of the cover plate 54. Therefore, an adhesive 78 for bonding the nozzle plate 51 and the intermediate plate 52 to each other is bonded to the intermediate plate 52 via the protective film 120.

It should be noted that the protective film 120 is formed of an organic insulating material such as a para-xylylene resin material (e.g., parylene (a registered trademark)). It should be noted that the protective film 120 can be formed of tantalum oxide ($Ta_2O_5$), silicon nitride (SiN), silicon carbide (SiC), silicon oxide ($SiO_2$), diamond-like carbon, or the like, or can include at least any one of these materials.

[Operation Method of Printer 1]

Then, there will be described below when recording a character, a figure, or the like on the recording target medium P using the printer 1.

It is assumed that in the printer 1, the ink tanks 4 are sufficiently filled with ink of respective colors different from each other as an initial state. There is created a state in which the inkjet heads 5 are filled with the ink in the ink tanks 4 via the ink circulation mechanisms 6, respectively.

Under such an initial state, when making the printer 1 operate, the recording target medium P is conveyed toward the +X side while being pinched by the rollers 11, 12 of the conveying mechanisms 2, 3. By the carriage 29 moving in the Y direction at the same time as the conveyance of the recording target medium P, the inkjet heads 5 mounted on the carriage 29 reciprocate in the Y direction.

While the inkjet heads 5 reciprocate, the ink is arbitrarily ejected toward the recording target medium P from each of the inkjet heads 5. Thus, it is possible to perform recording of the character, the image, and the like on the recording target medium P.

Here, the operation of each of the inkjet heads 5 will hereinafter be described in detail.

In such a recirculating side-shoot type inkjet head 5 as in the first embodiment, first, by making the pressure pump 24 and the suction pump 25 shown in FIG. 2 operate, the ink is circulated in the circulation flow channel 23. In this case, as shown in FIG. 4, the ink flowing through the ink supply tube 21 is supplied to the inside of each of the ejection channels 61 through the entrance common ink chamber 71 and the entrance slits 72. The ink supplied to the inside of each of the ejection channels 61 flows through the ejection channels 61 in the Y direction. Subsequently, the ink is discharged to the exit common ink chamber 75 through the exit slits 76, and is then returned to the ink tank 4 through the ink discharge tube 22. Thus, it is possible to circulate the ink between the inkjet head 5 and the ink tank 4.

When the reciprocation of the inkjet head 5 is started due to the movement of the carriage 29 (see FIG. 1), the drive voltages are applied between the common electrodes 85, and the individual electrodes 88 via the flexible printed board 92. On this occasion, the individual electrode 88 is set at a drive potential Vdd, and the common electrode 85 is set at a reference potential GND to apply the drive voltage between the electrodes 85, 88. Then, an electrical field is generated in a portion sandwiched between opposed areas in each of the drive walls 65, and thus, each of the drive walls 65 makes a flexural deformation to form a V shape centering on a middle portion in the Z direction. In other words, the drive walls 65 deform so that the volume of the ejection channel 61 increases.

After the volume of each of the ejection channels 61 has increased, the voltage applied between the common electrodes 85 and the individual electrodes 88 is set to zero. Then, the drive walls 65 are restored, and the volume of the ejection channel 61 having once increased is restored to the original volume. Thus, the internal pressure of the ejection channel 61 increases to pressurize the ink. As a result, the ink is ejected as a droplet through the nozzle hole 51*a*. By the ink ejected from the nozzle hole 51*a* landing on the recording target medium P, it is possible to record the character, the image, and the like on the recording target medium P.

[Method of Manufacturing Head Chip 50]

Then, a method of manufacturing the head chip 50 will be described.

Figure 10:
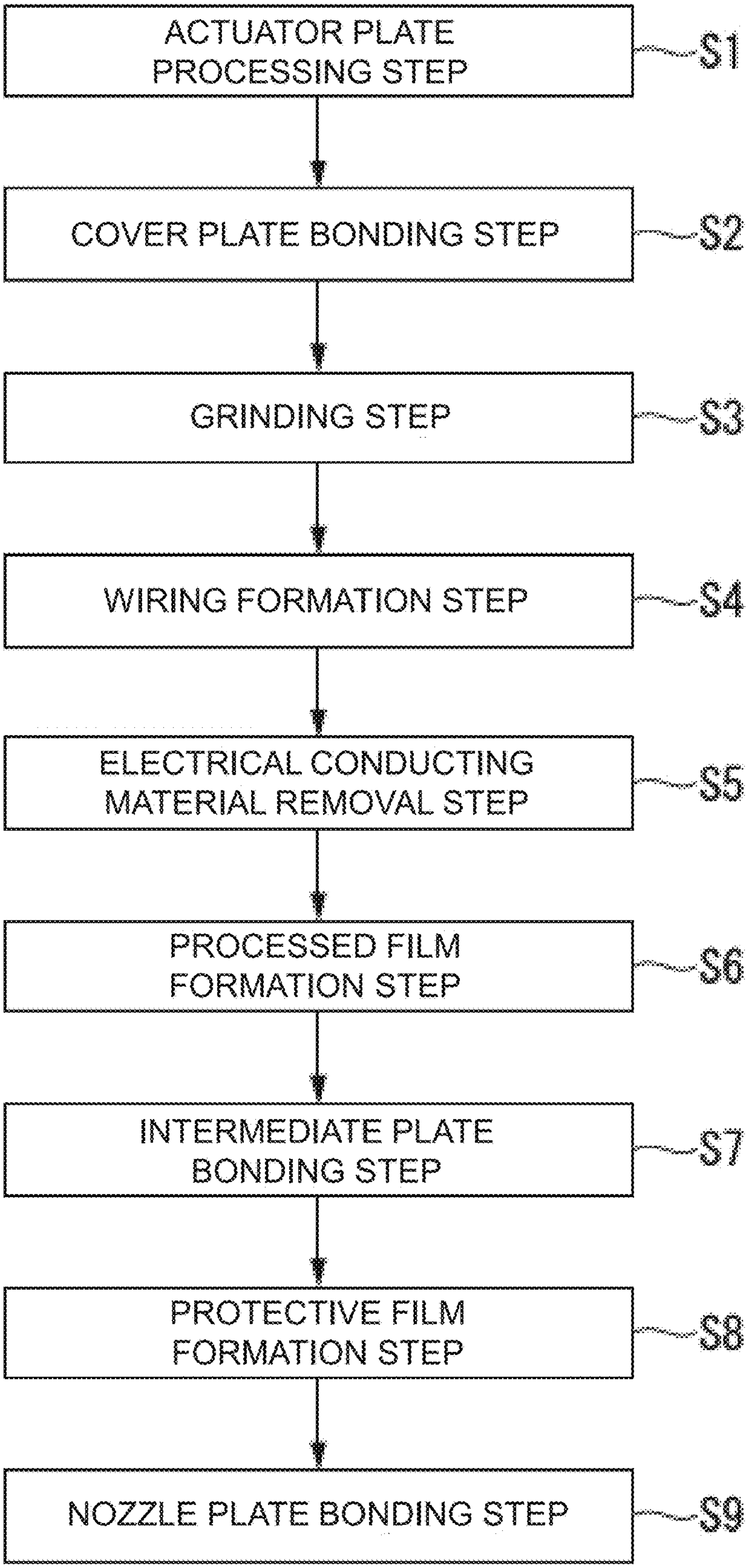
FIG. 10 is a flowchart showing a method of manufacturing the head chip according to the first embodiment.

FIG. 10 is a flowchart showing the method of manufacturing the head chip 50. FIG. 11 through FIG. 24 are each a process diagram for explaining the method of manufacturing the head chip 50. Out of FIG. 11 through FIG. 24, FIG. 11 through FIG. 13 are cross-sectional views corresponding to FIG. 4, FIG. 14 through FIG. 20 are cross-sectional views corresponding to FIG. 5, FIG. 21 through FIG. 23 are cross-sectional views corresponding to FIG. 6, and FIG. 24 is a plan view corresponding to FIG. 8. In the following description, there is described when manufacturing the head chip 50 chip by chip as an example for the sake of convenience.

As shown in FIG. 10, the method of manufacturing the head chip 50 is provided with an actuator plate processing step S1, a cover plate bonding step S2, a grinding step S3, a wiring formation step S4, a electrical conducting material removal step S5, a processed film formation step S6, an intermediate plate bonding step S7, a protective film formation step S8, and a nozzle plate bonding step S9.

Figure 11:
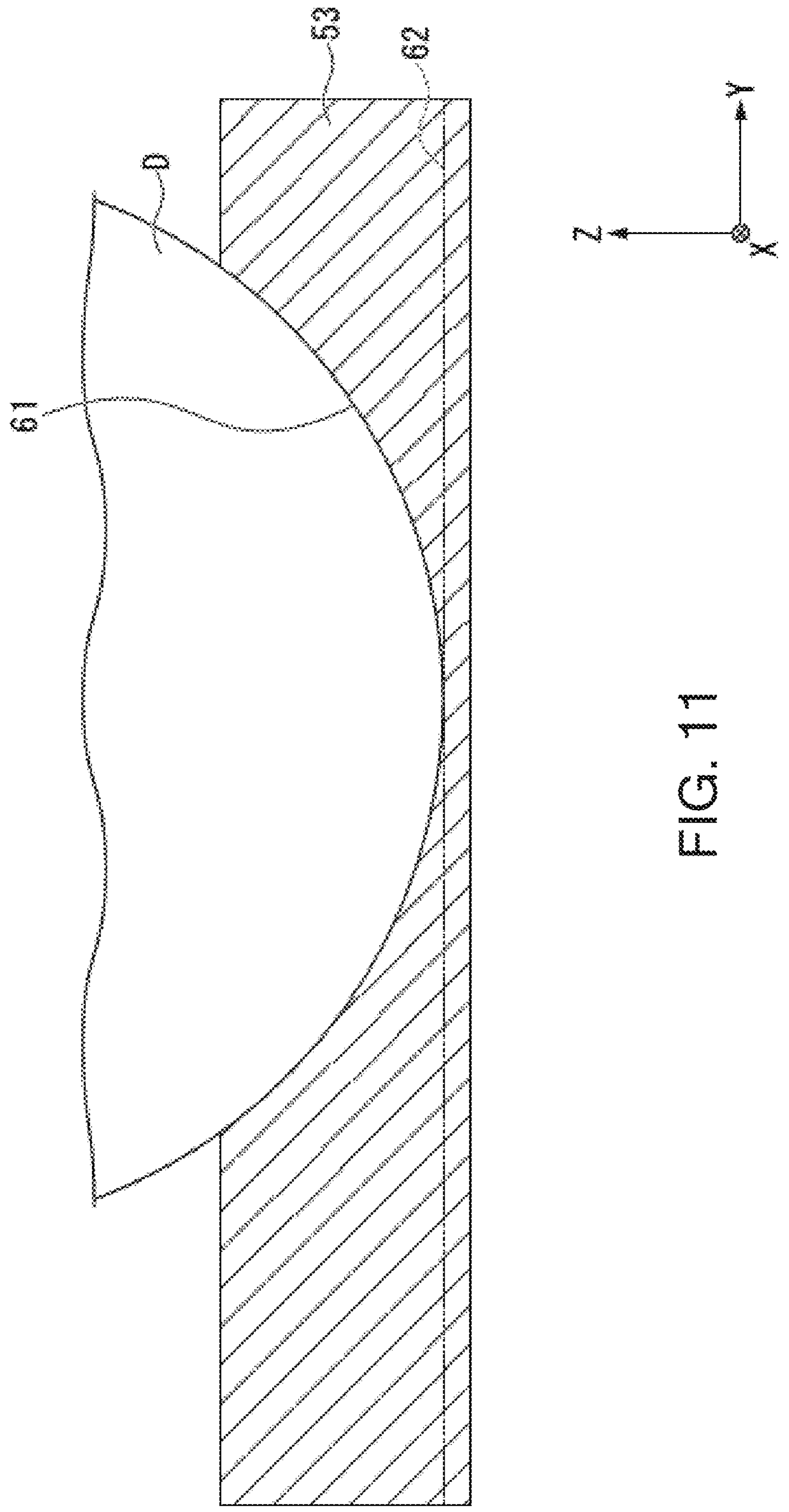
FIG. 11 is a process diagram for explaining the method of manufacturing the head chip according to the first embodiment.
Figure 14:
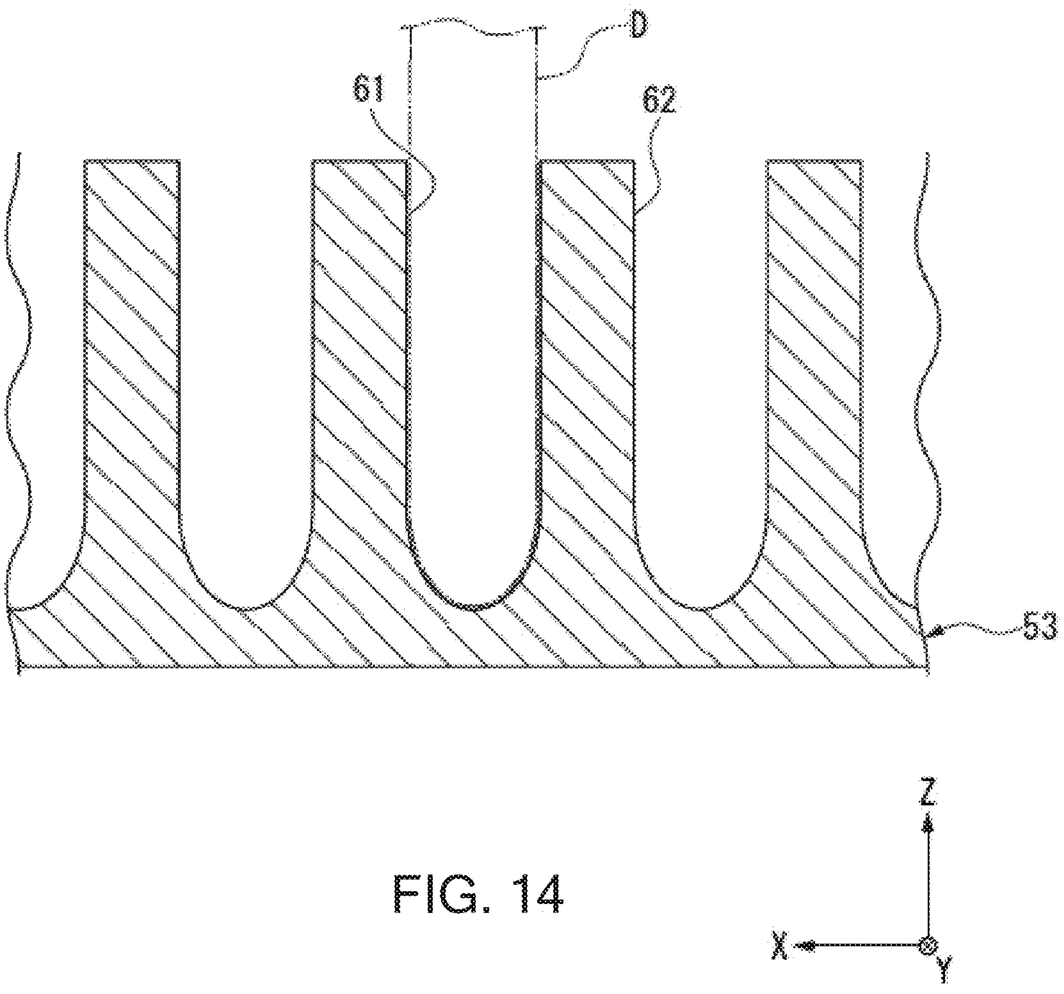
FIG. 14 is a process diagram for explaining the method of manufacturing the head chip according to the first embodiment.
Figure 21:
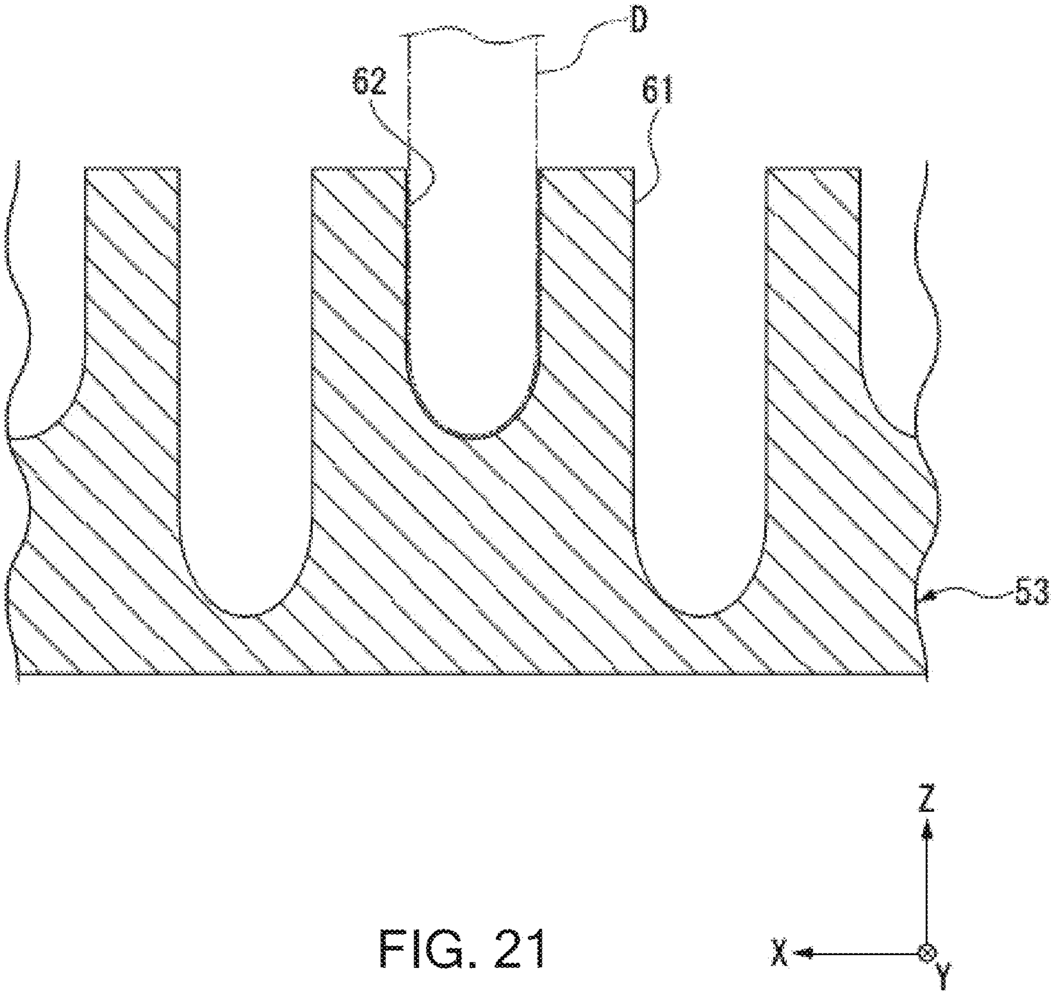
FIG. 21 is a process diagram for explaining the method of manufacturing the head chip according to the first embodiment.

As shown in FIG. 11, FIG. 14, and FIG. 21, in the actuator plate processing step S1, a dicer D is made to enter a formation area of the ejection channels 61 and the non-ejection channels 62 in the actuator plate 53 from above the actuator plate 53. The dicer D is formed to have a disk-like shape when viewed from the X direction. In the actuator plate processing step S1, in the formation area of the non-ejection channels 62, a running amount in the Y direction of the dicer D is made larger than that in the formation area of the ejection channels 61. Thus, the bottom surface of the ejection channel 61 is formed to have a circular arc shape convex downward, and the bottom surface of the non-ejection channel 62 is formed to have a linear shape. Further, a blade edge of the dicer D gradually decreases in thickness in a direction toward the tip. Therefore, when viewed from the Y direction, the lower end portion of each of the ejection channels 61 and the non-ejection channels 62 gradually tapers in a downward direction. It should be noted that an entering amount of the dicer D is set larger than a finished thickness of the actuator plate 53 in the subsequent grinding step S3.

Figure 12:
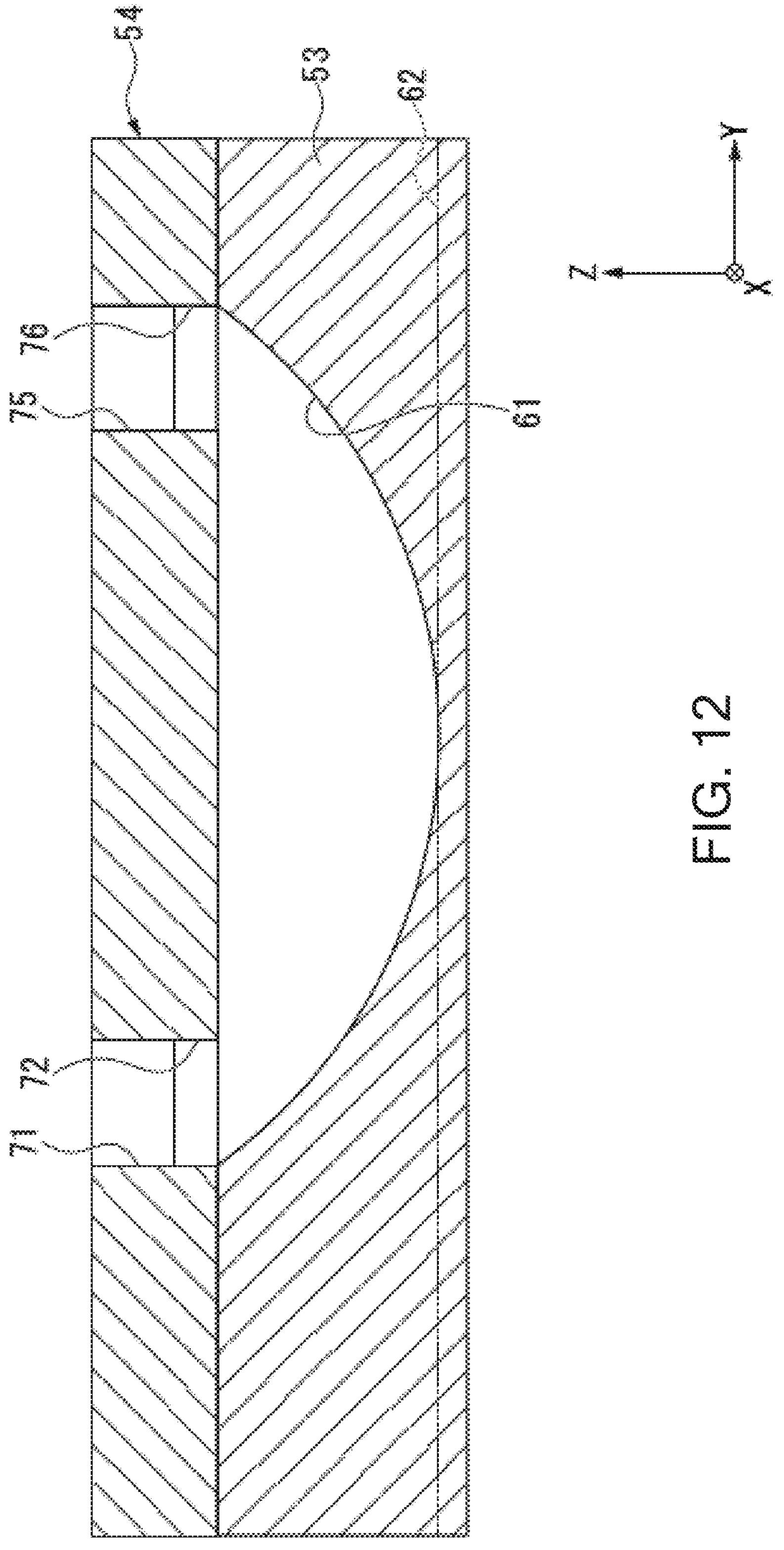
FIG. 12 is a process diagram for explaining the method of manufacturing the head chip according to the first embodiment.
Figure 15:
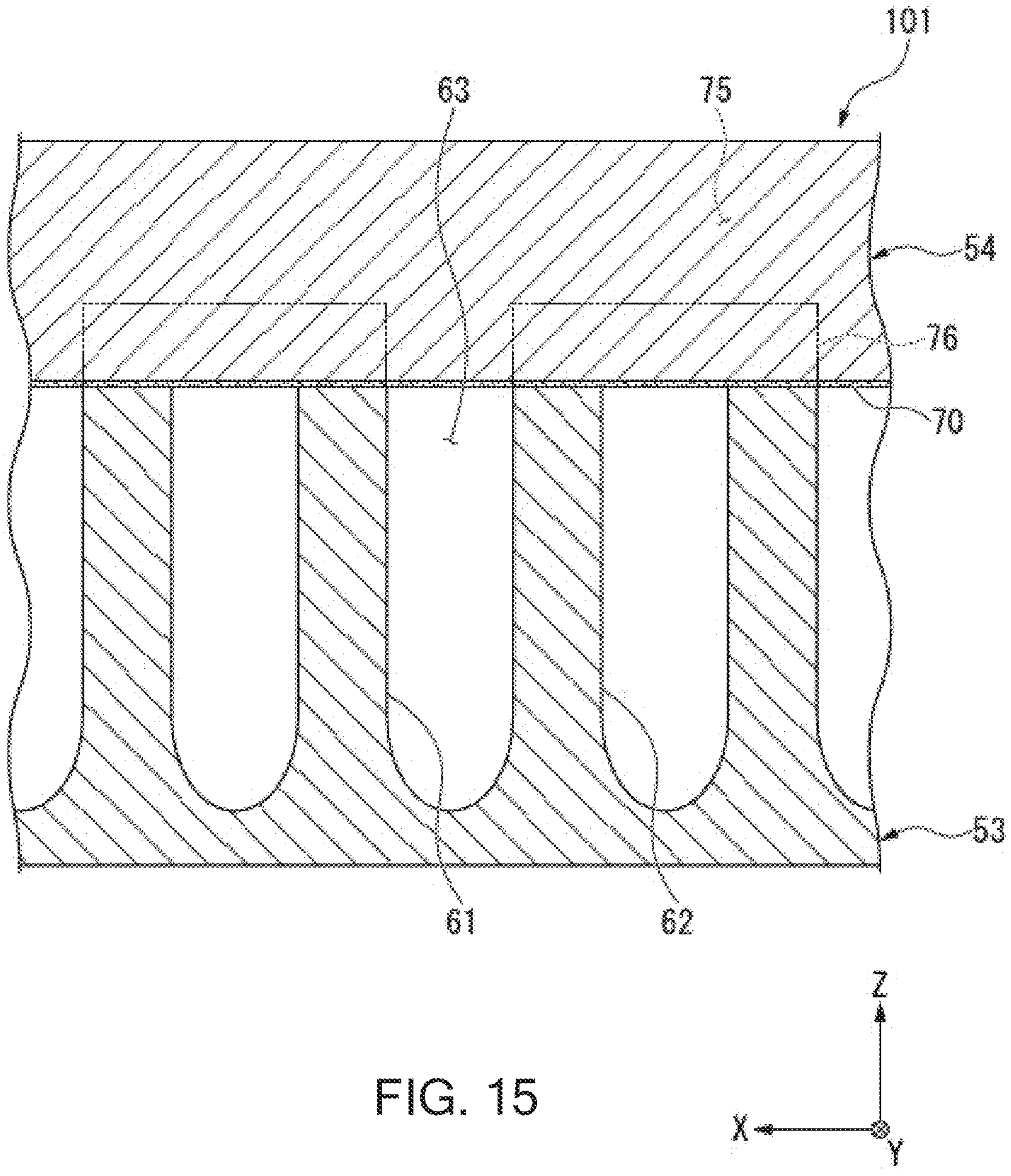
FIG. 15 is a process diagram for explaining the method of manufacturing the head chip according to the first embodiment.

As shown in FIG. 12, FIG. 15, in the cover plate bonding step S2, the cover plate 54 is attached to the upper surface of the actuator plate 53 via the adhesive 70. Thus, there is formed a laminated body 101 obtained by stacking the actuator plate 53 and the cover plate 54 on one another.

Figure 13:
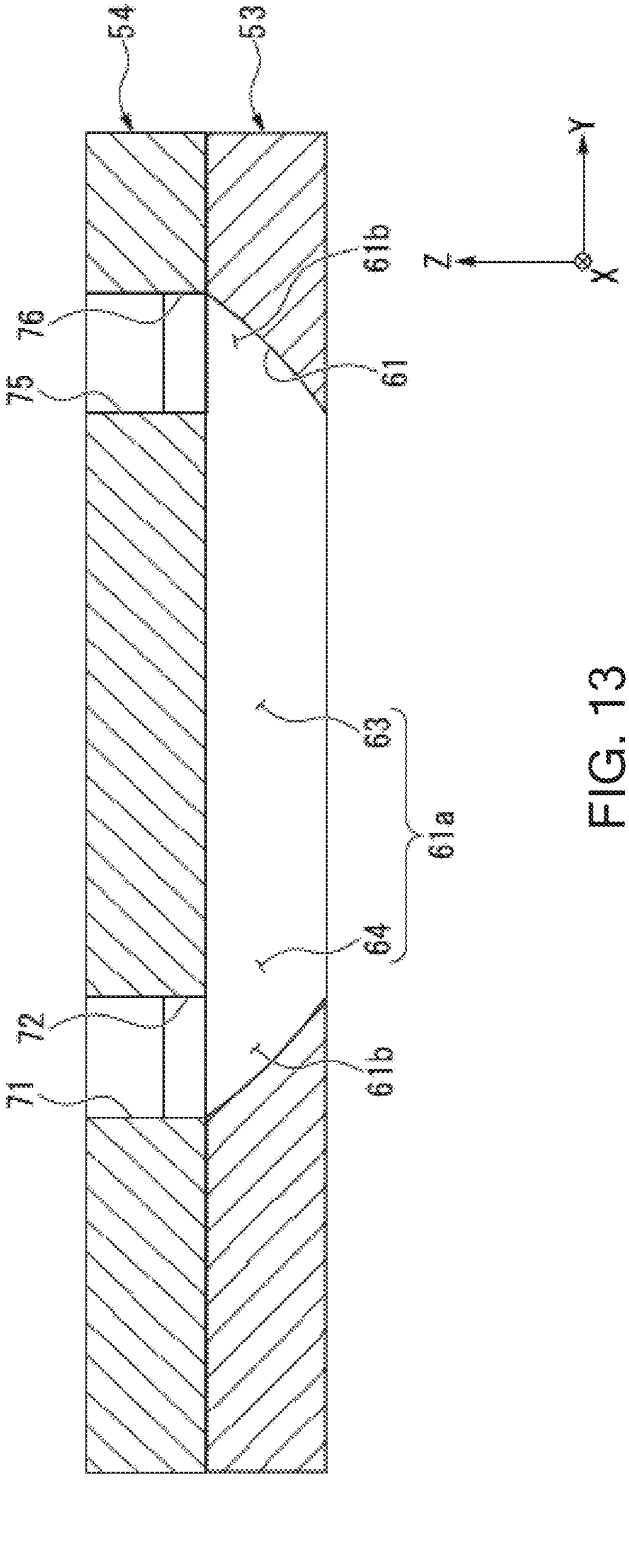
FIG. 13 is a process diagram for explaining the method of manufacturing the head chip according to the first embodiment.
Figure 16:
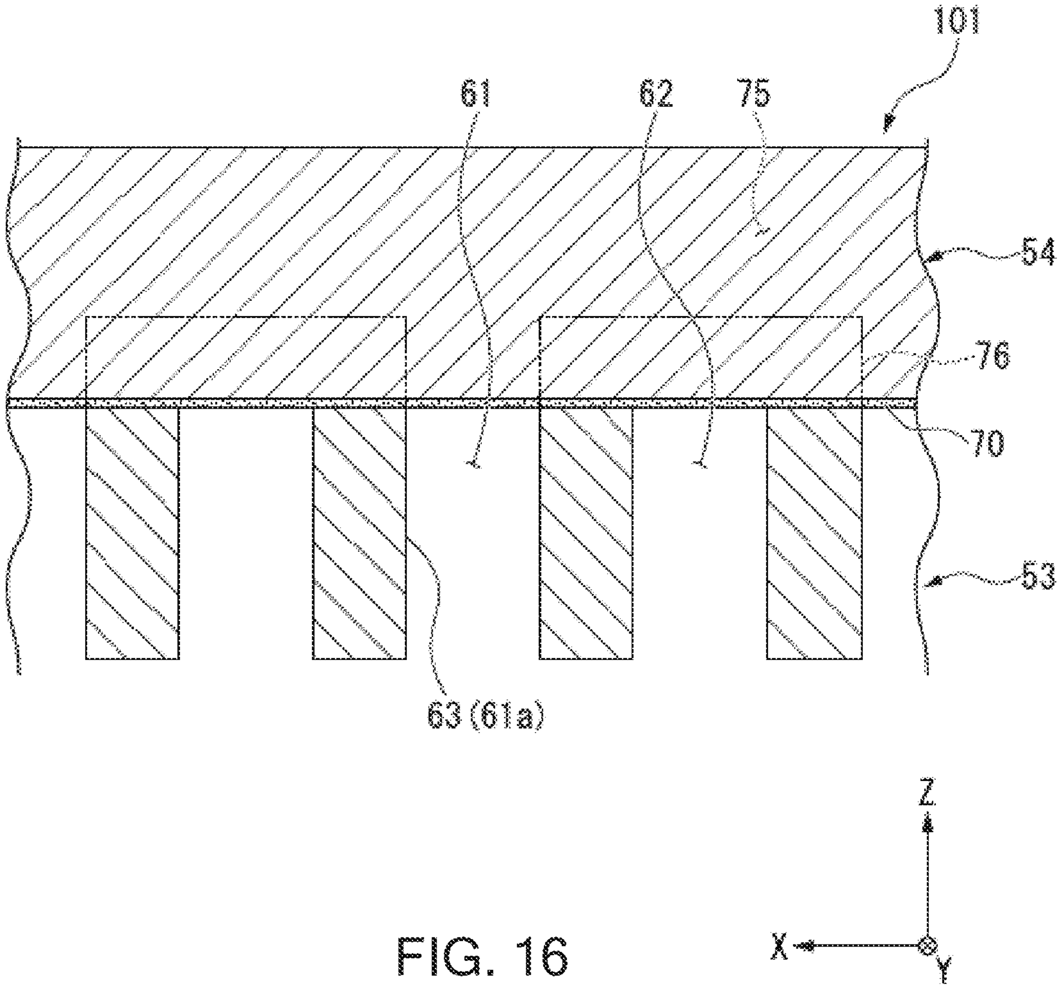
FIG. 16 is a process diagram for explaining the method of manufacturing the head chip according to the first embodiment.
Figure 22:
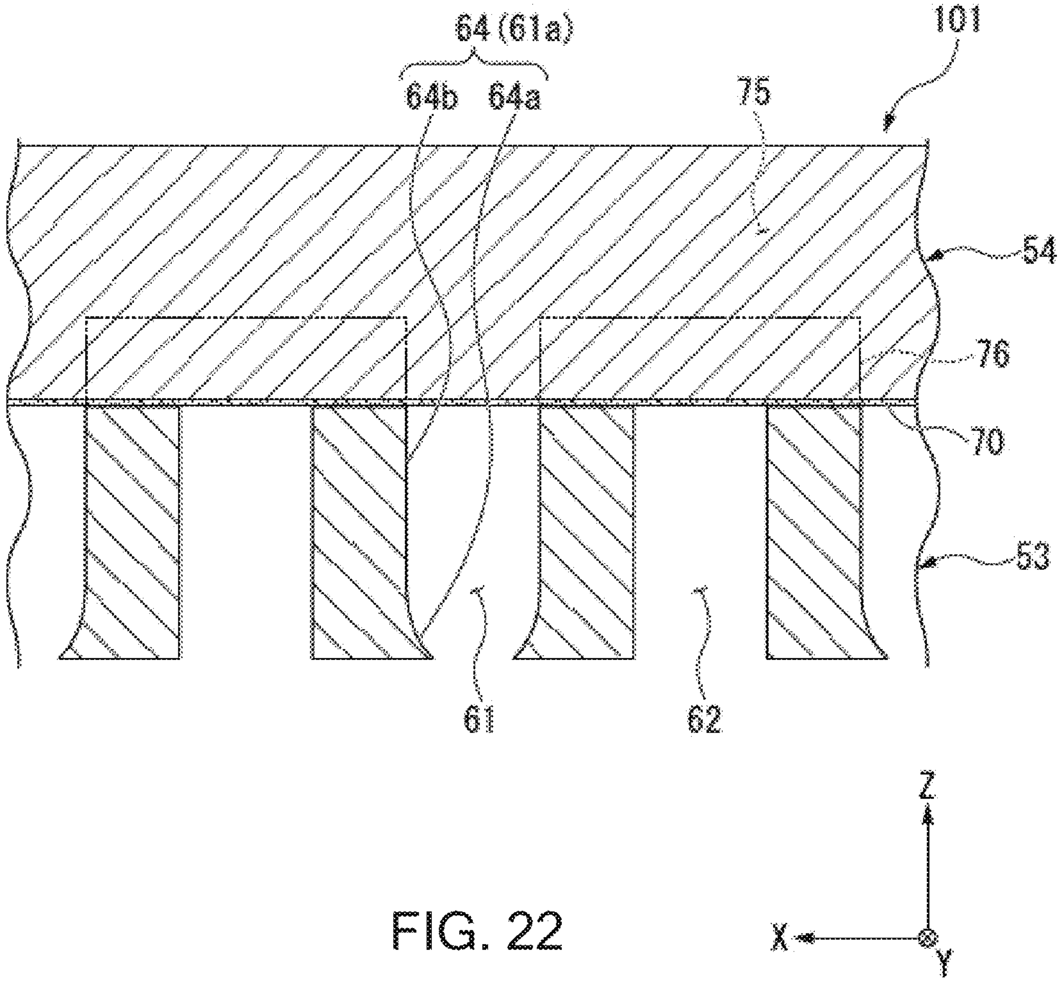
FIG. 22 is a process diagram for explaining the method of manufacturing the head chip according to the first embodiment.

As shown in FIG. 13, FIG. 16, and FIG. 22, in the grinding step S3, grinding processing is performed on the lower surface of the actuator plate 53. Specifically, the actuator plate 53 is ground until the ejection channels 61 and the non-ejection channels 62 open on the lower surface of the actuator plate 53. Here, in the actuator plate processing step S1 described above, the bottom surface of each of the ejection channels 61 is formed to have the circular arc shape convex downward, and at the same time, the blade edge of the dicer D is processed so as to gradually decrease in thickness in the direction toward the tip. On that basis, in a portion corresponding to the uniform part 63 in each of the ejection channels 61, the grinding processing is performed until blade edge scars of the dicer D disappear. In contrast, in a portion corresponding to the changing part 64 of each of the ejection channels 61, the blade edge scars remain. In other words, it results in that in the changing part 64 of each of the ejection channels 61, the portion remaining as the blade edge scar of the dicer D constitutes the decreasing part 64*a*.

Figure 17:
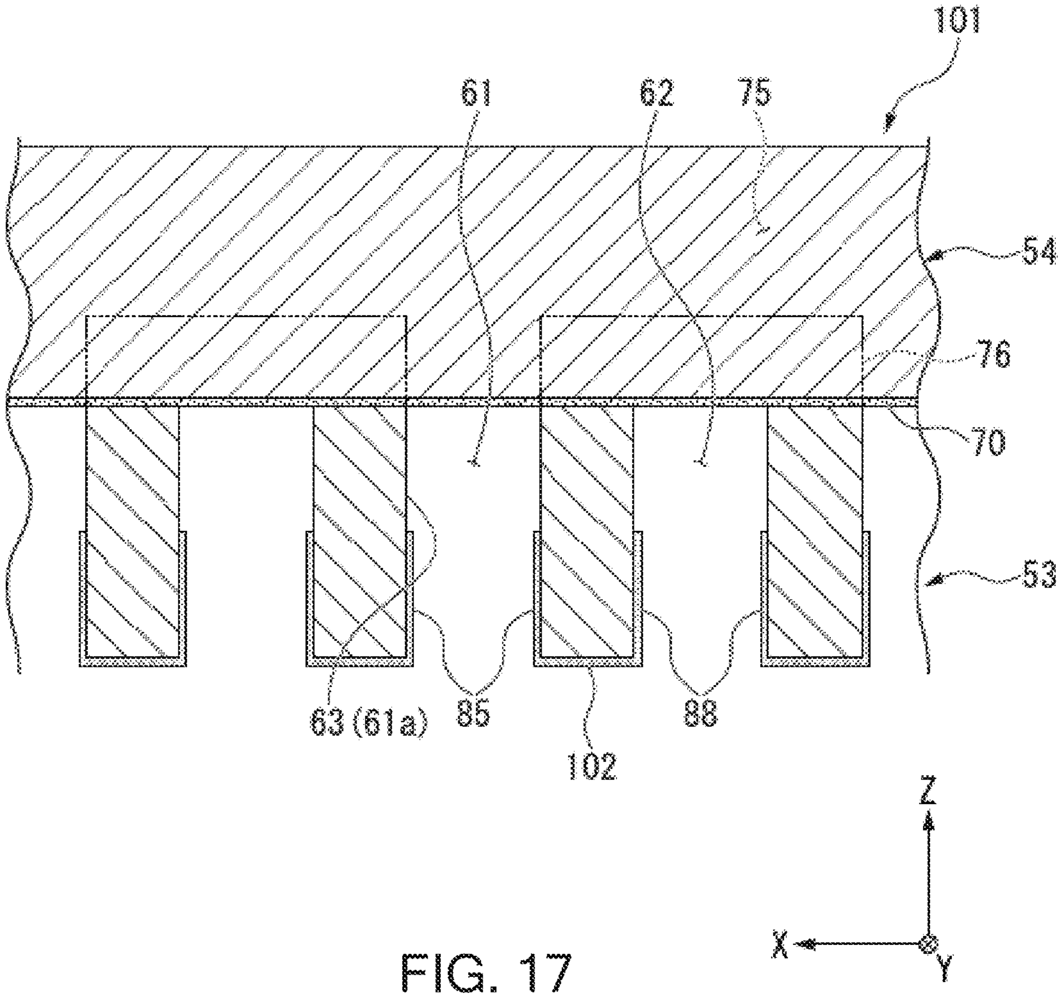
FIG. 17 is a process diagram for explaining the method of manufacturing the head chip according to the first embodiment.
Figure 23:
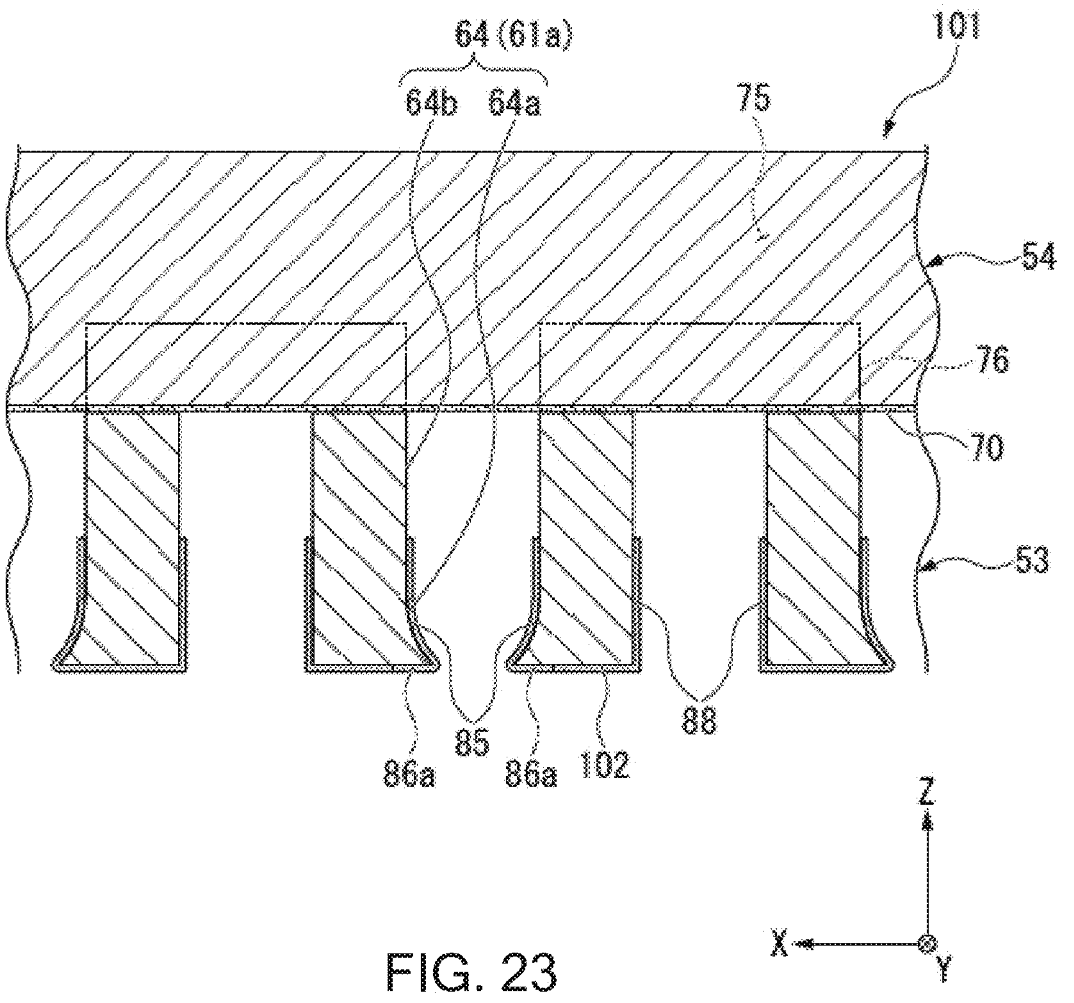
FIG. 23 is a process diagram for explaining the method of manufacturing the head chip according to the first embodiment.
Figure 24:
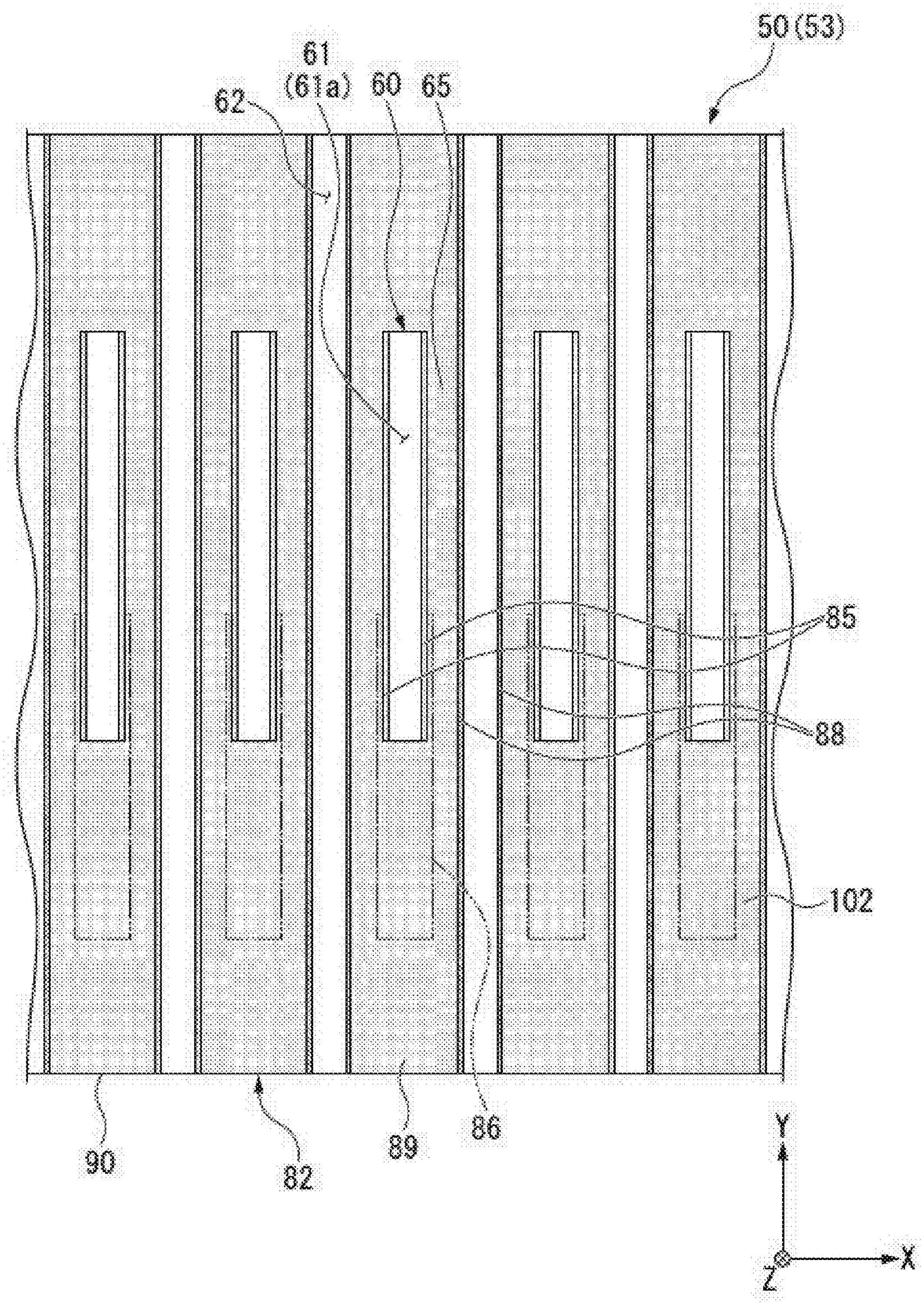
FIG. 24 is a process diagram for explaining the method of manufacturing the head chip according to the first embodiment.

As shown in FIG. 17, FIG. 23, and FIG. 24, in the wiring formation step S4, the drive wiring is formed by depositing the electrode material from below the actuator plate 53. In the wiring formation step S4, oblique evaporation is performed on the lower surface of the actuator plate 53 from the +X side and the −X side. Then, a lower surface deposition part 102 including the extraction parts 86*a*, the common terminals 86*b*, and the individual terminals 89 is deposited on the lower surface of the actuator plate 53. Further, while the common electrodes 85 are formed through the lower end openings of the ejection channels 61, the individual electrodes 88 are formed through the lower end openings of the non-ejection channels 62.

Figure 18:
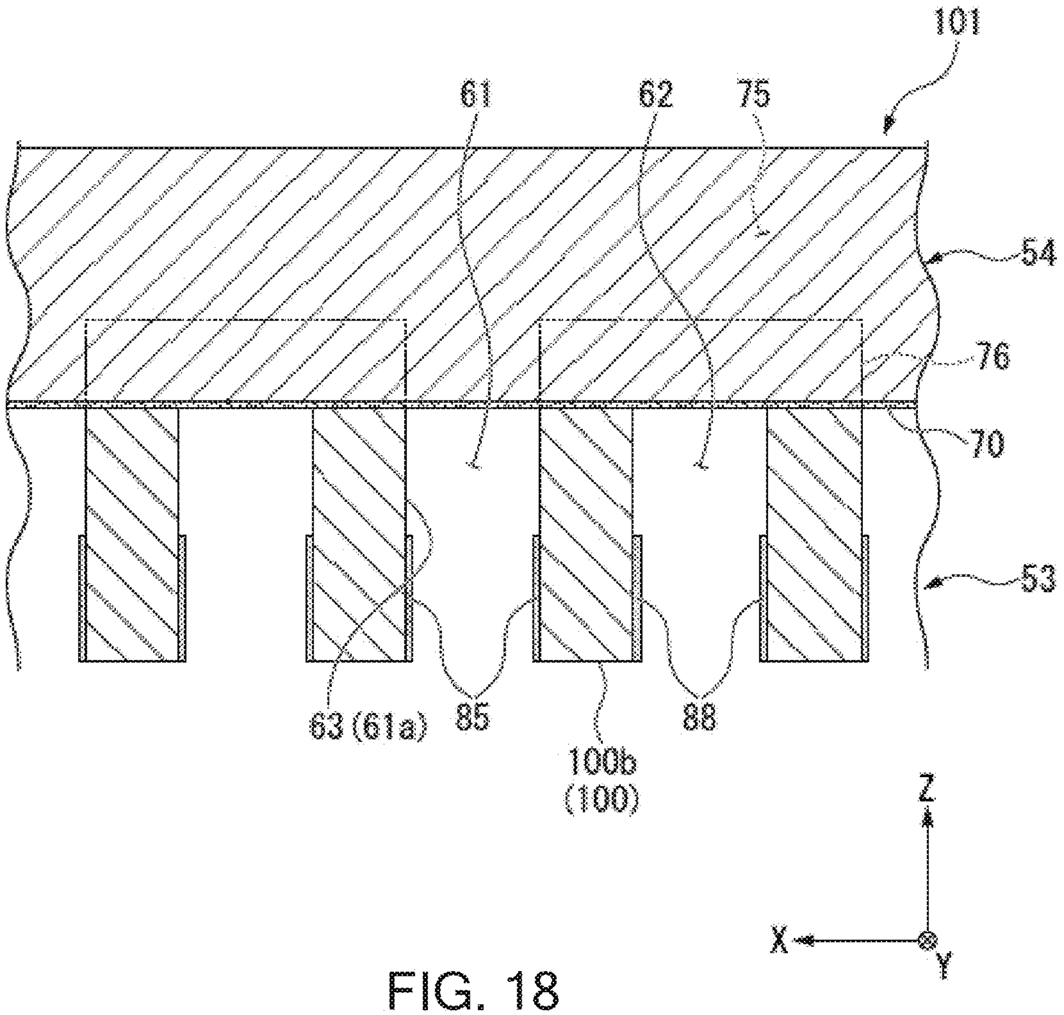
FIG. 18 is a process diagram for explaining the method of manufacturing the head chip according to the first embodiment.

As shown in FIG. 18, in the electrical conducting material removal step S5, an unwanted part of the lower surface deposition part 102 deposited in the wiring formation step S4 is removed. Specifically, the lower surface of the actuator plate 53 is scanned with a laser beam in the X direction and the Y direction. In the first embodiment, in the actuator plate 53, the electrical conducting material having adhered on a portion other than the formation areas of the extraction parts 86*a*, the common terminals 86*b*, and the individual terminals 89 is removed. Thus, the blank area 100 where the laser irradiation scars L remain is formed on the lower surface of the actuator plate 53. It should be noted that after the electrical conducting material removal step S5, the partitioning grooves 91 are provided to the lower surface of the actuator plate 53.

Figure 19:
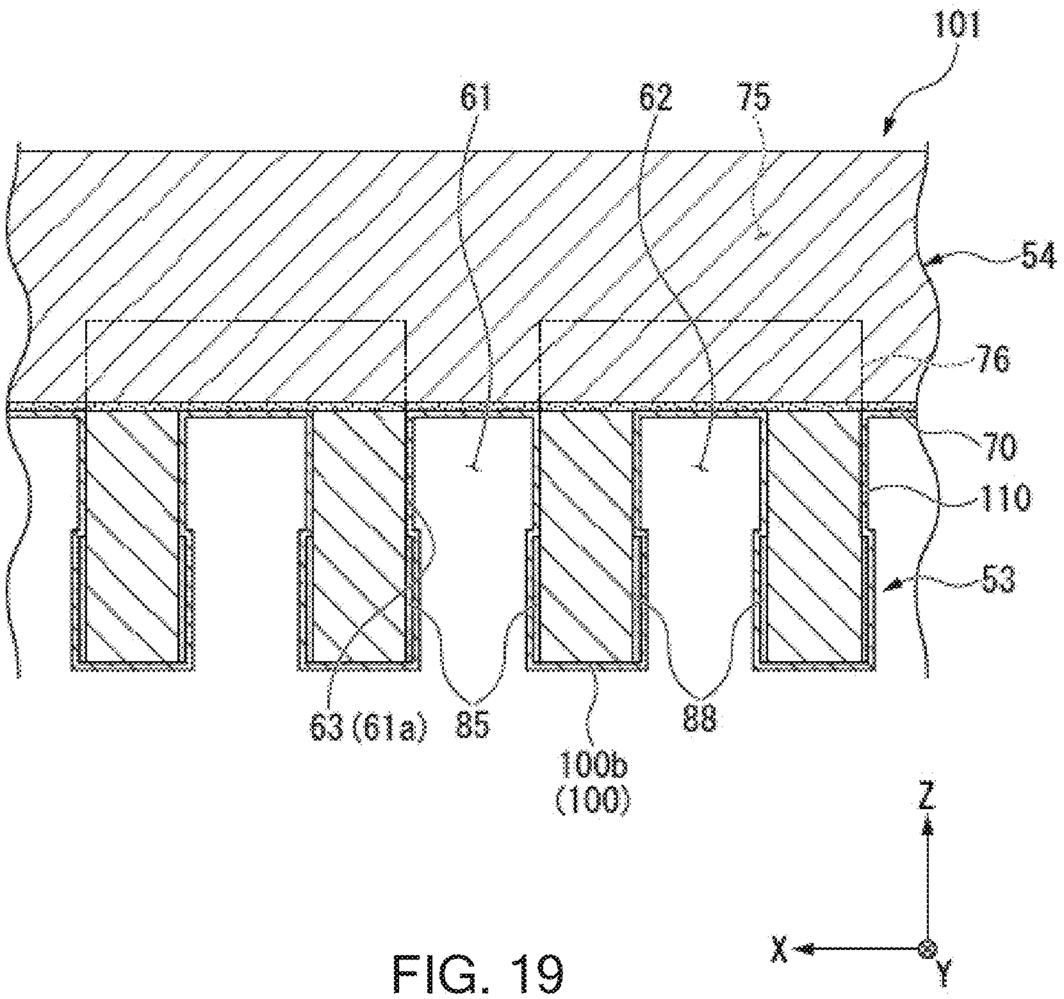
FIG. 19 is a process diagram for explaining the method of manufacturing the head chip according to the first embodiment.

As shown in FIG. 19, in the processed film formation step S6, the laminated body obtained by stacking the actuator plate 53 and the cover plate 54 are stacked on one another is dipped in a processing agent (a silane coupling agent). Thus, the processed film 110 is formed throughout a portion exposed inside each of the channels 61, 62 on the lower surface of the actuator plate 53, the inner surfaces of the channels 61, 62, and the lower surface of the cover plate 54.

Figure 20:
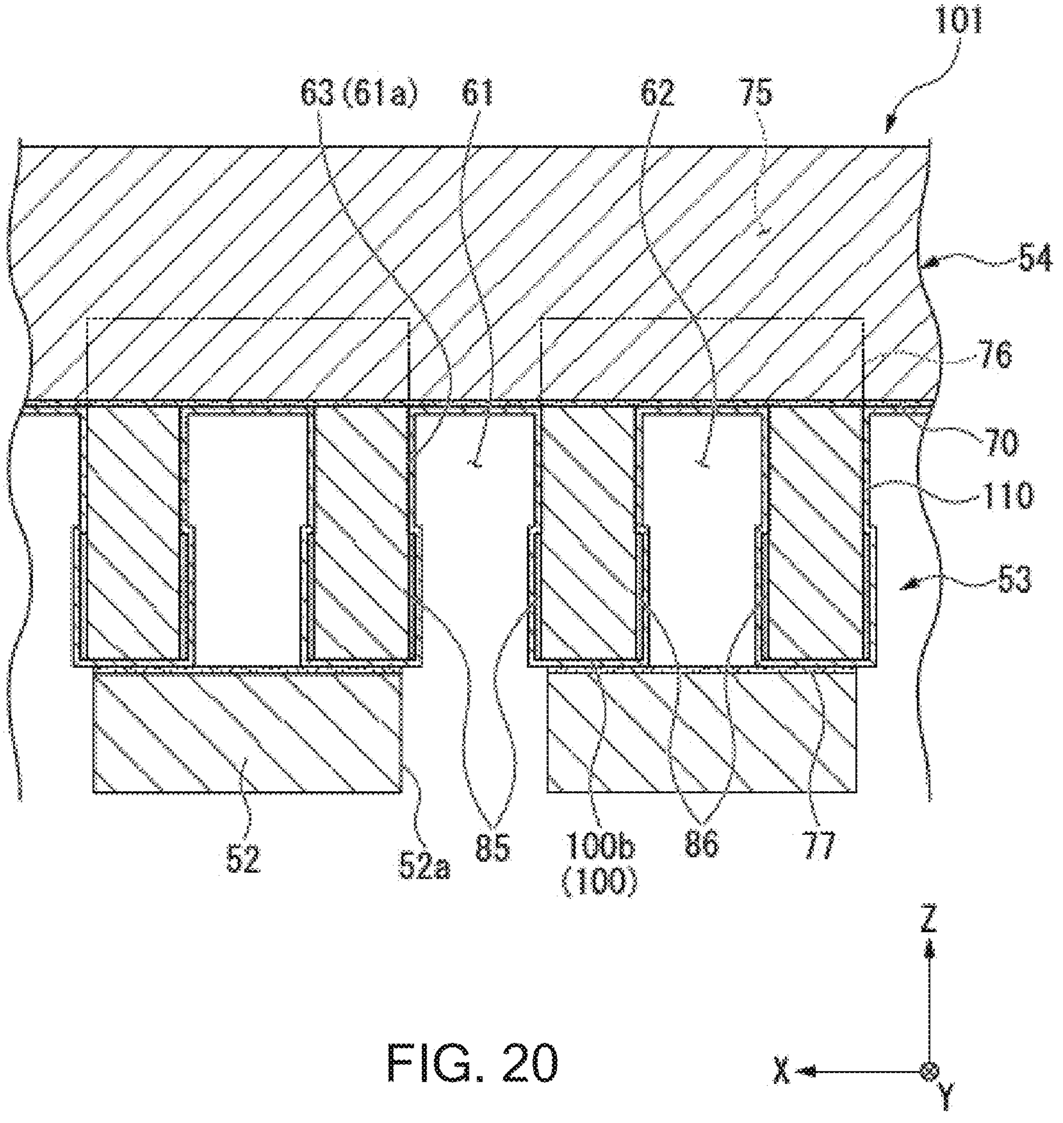
FIG. 20 is a process diagram for explaining the method of manufacturing the head chip according to the first embodiment.

As shown in FIG. 20, in the intermediate plate bonding step S7, the intermediate plate 52 is bonded to the lower surface of the actuator plate 53. Specifically, the adhesive 77 is applied on the lower surface of the actuator plate 53 via the processed film 110, and then the intermediate plate 52 is bonded via the adhesive 77.

In the protective film formation step S8, the protective film 120 is provided to the portions exposed inside the channels 61, 62 in the inner surfaces of the channels 61, 62, the lower surface of the intermediate plate 52, the inner surfaces of the communication holes 52*a*, and the lower surface of the cover plate 54. It should be noted that when adopting the para-xylylene resin material as the protective film 120, it is possible to form the protective film 120 using, for example, a chemical vapor deposition (CVD) process.

In the nozzle plate bonding step S9, the nozzle plate 51 is attached to the lower surface of the intermediate plate 52 via the adhesive 78 in a state in which the nozzle holes 51*a* and the ejection channels 61 are aligned with each other.

Due to the steps described hereinabove, the head chip 50 is manufactured.

As described above, in the present embodiment, there is adopted the configuration in which the second removal area (the electrical conducting material removal area) 100*b* in which the laser irradiation scars L are formed throughout the entire area in the X direction between the lower end opening (the first opening) of each of the ejection channels 61 and the lower end opening (the second opening) of each of the non-ejection channels 62 is disposed in the portion located between the lower end opening of each of the ejection channels 61 and the lower end opening of each of the non-ejection channels 62 on the lower surface (the first principal surface) of the actuator plate 53.

According to this configuration, when the electrical conducting material is deposited from below the actuator plate 53 in forming the electrodes (the common electrodes 85) in the channels 61, 62, by removing the electrical conducting material (the lower surface deposition part 102) having adhered on the lower surface of the actuator plate 53 with the laser irradiation, it is possible to decouple the common electrode 85 and the individual electrode 88 adjacent to each other. In this case, by disposing the second removal area 100*b* throughout the entire area in the X direction between the lower end opening of each of the ejection channels 61 and the lower end opening of each of the non-ejection channels 62, it is easy to ensure the inter-electrode distance between the common electrode 85 and the individual electrode 88 adjacent to each other. Therefore, it is possible to provide the head chip 50 which prevents the occurrence of the short circuit caused by the common electrode 85 and the individual electrode 88 adjacent to each other being bridged with the ink while shortening the distance (pitch) between the channels 61, 62 adjacent to each other, and which is excellent in reliability and durability.

In the head chip 50 according to the present embodiment, there is adopted the configuration in which the first connection wiring part (the first wiring part) 86 is provided with the pair of extraction parts (the first lateral connection parts) 86*a* which are arranged at both sides in the X direction with respect to the lower end opening of the ejection channel 61, and which are connected to the common electrode (the side surface part) 85, and the common terminal (the terminal part) 86*b* which connects the pair of extraction parts 86*a* to each other, and which is connected to the flexible printed board (external wiring) 92.

According to this configuration, since the conduction between the common electrodes 85 and the first connection wiring part 86 is ensured by the extraction parts 86*a*, it is possible to ensure the electrical reliability between the common electrodes 85 and the first connection wiring part 86 while ensuring the inter-electrode distance at least between the central portion in the Y direction of the ejection channel 61 and the central portion in the Y direction of the non-ejection channel 62.

In the head chip 50 according to the present embodiment, there is adopted the configuration in which the ejection channel 61 is provided with the uprise part 61*b* gradually decreasing in dimension in the Y direction in the downward direction when viewed from the X direction.

The uprise part 61*b* and the lower surface of the actuator plate 53 are apt to form an acute angle in a portion connected to the uprise part 61*b* in the lower end opening edge of the ejection channel 61. When depositing the electrical conducting material from below in this state, it is difficult to deposit the common electrode 85 on the bottom surface of the uprise part 61*b* in the desired condition.

Therefore, in the present embodiment, by ensuring the conduction between the common electrode 85 and the first connection wiring part 86 via the extraction parts 86*a*, it is possible to ensure the electrical reliability between the common electrode 85 and the first connection wiring part 86.

In the head chip 50 according to the present embodiment, there is adopted the configuration in which the extraction parts 86*a* extend to a position overlapping the uniform part 63 of the ejection channel 61 in the Y direction, and are at the same time connected to the portion provided to the uniform part 63 in the common electrode 85.

The decreasing part 64*a* and the lower surface of the portion connected to the decreasing part 64*a* are apt to form an acute angle in the lower end opening edge of the ejection channel 61. When depositing the electrical conducting material from below in this state, it is difficult to deposit the common electrode 85 in the decreasing part 64*a* in the desired condition.

Therefore, in the present embodiment, by extending the extraction parts 86*a* to the position overlapping the uniform part 63 in the Y direction, it is possible to connect the extraction parts 86*a* to the common electrode 85 provided to the uniform part 63. As a result, it is possible to ensure the electrical reliability between the common electrode 85 and the first connection wiring part 86.

In the head chip 50 according to the present embodiment, there is adopted the configuration in which the processed film (the first bonding film) 110 which is higher in bonding force with the lower surface of the actuator plate 53 compared to the bonding force between the lower surface of the actuator plate 53 and the adhesive 77 intervenes between the lower surface of the actuator plate 53 and the adhesive 77.

According to this configuration, it is possible to ensure the area where the actuator plate 53 is exposed in the lower surface of the actuator plate 53 due to the second removal area 100*b*. Moreover, in the present embodiment, since the adhesive 77 is formed via the processed film 110 high in bonding force with the lower surface of the actuator plate 53, it is possible to ensure the bonding strength between the lower surface of the actuator plate 53 and the adhesive 77. In particular, in the second removal area 100*b*, there is formed fine asperity with the laser irradiation scars L. Therefore, it is possible to ensure the physical bonding force between the processed film 110 and the lower surface of the actuator plate 53 due to a so-called anchor effect, and thus, it is possible to stably form the processed film 110 on the lower surface of the actuator plate 53.

In the inkjet head 5 and the printer 1 according to the present embodiment, since the head chip 50 described above is provided, it is possible to provide the inkjet head 5 and the printer 1 excellent in durability and reliability.

In the embodiment described above, there is described the configuration in which the second removal area 100*b* is formed in the portions located in the central portion and the +Y-side end portion in the Y direction in the portion located between the lower end opening of the ejection channel 61 and the lower end opening of the non-ejection channel 62, but this configuration is not a limitation. It is possible for the second removal area 100*b* to be formed throughout the entire area in the Y direction in the portion located between the lower end opening of the ejection channel 61 and the lower end opening of the non-ejection channel 62. In other words, the first connection wiring part 86 can be provided with a configuration in which the extraction part 86*a* (the third removal area 100*c*) is not provided. In this case, it is possible to adopt a configuration in which the common electrodes 85 and the common terminal 86*b* are directly coupled to each other.

In the embodiment described above, there is described the configuration in which the ejection channel 61 is provided with the uprise part 61*b* and the decreasing part 64*a*, but this configuration is not a limitation. The ejection channel 61 can be uniform in dimension in the X direction or the Y direction throughout the whole length in the Z direction.

In the embodiment described above, there is described the configuration in which the first connection wiring part 86 is disposed on the lower surface of the actuator plate 53, but this configuration is not a limitation. It is possible for the first connection wiring part 86 to be disposed on the upper surface (the first principal surface) of the actuator plate 53.

In the embodiment described above, there is described the configuration in which the entire area where the first connection wiring part 86 and the individual terminal 89 are not formed in the lower surface of the actuator plate 53 is removed by the laser irradiation, but this configuration is not a limitation. It is sufficient that at least a portion located between the lower openings of the channels 61, 62 in the lower surface of the actuator plate 53 is removed by the laser irradiation.

Figure 25:
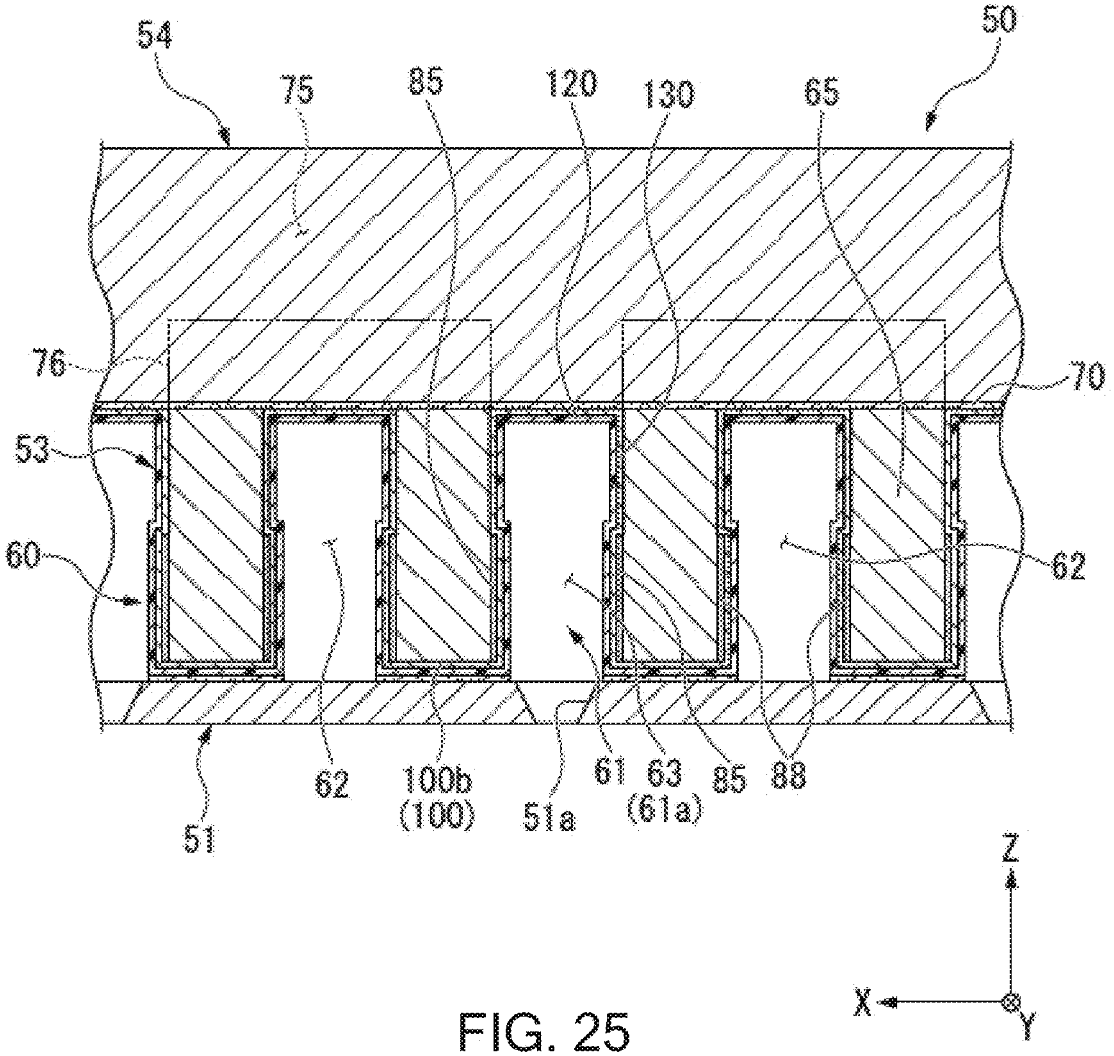
FIG. 25 is a cross-sectional view of a head chip according to a modified example of the first embodiment.

In the first embodiment described above, there is described the configuration in which the intermediate plate 52 is arranged between the actuator plate 53 and the nozzle plate 51, but this configuration is not a limitation. It is possible for the nozzle plate 51 to directly be stacked on the lower surface of the actuator plate 53. In this case, as shown in FIG. 25, the protective film 120 is disposed so as to cover the lower surface of the actuator plate 53 via a processed film (a second bonding film) 130. As the processed film 130, there can be selected a material which is higher in bonding force with the lower surface of the actuator plate 53 compared to the bonding force between the lower surface of the actuator plate 53 and the protective film 120.

According to this configuration, by forming the protective film 120 on the lower surface of the actuator plate 53 via the processed film 130, it is possible to stably dispose the protective film 120 on the lower surface of the actuator plate 53. Thus, it is possible to prevent lift or separation of the protective film 120 to protect the drive wiring. In particular, in the blank area 100, there is formed fine asperity with the laser irradiation scars L. Therefore, it is possible to ensure the physical bonding force between the processed film 130 and the lower surface of the actuator plate 53 due to a so-called anchor effect, and thus, it is possible to stably form the processed film 130 on the lower surface of the actuator plate 53.

Second Embodiment

Figure 26:
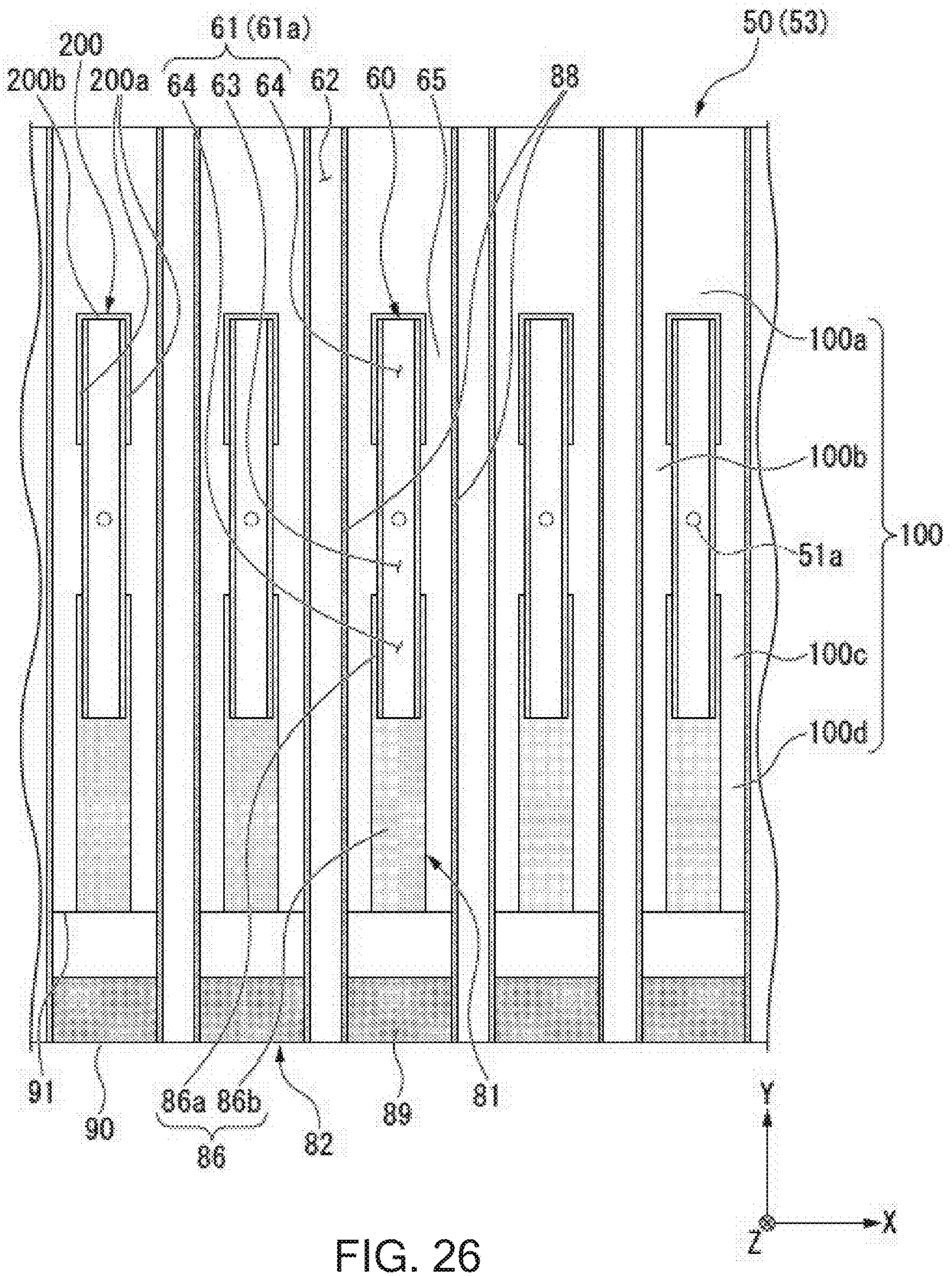
FIG. 26 is a plan view of an actuator plate according to a second embodiment.

FIG. 26 is a plan view of the actuator plate 53 according to a second embodiment.

In the head chip 50 shown in FIG. 26, on the lower surface of the actuator plate 53, there is formed a second connection wiring part 200. The second connection wiring part 200 surrounds a circumferential edge portion located in the +Y-side end portion (a second-side end portion) in the lower end opening of the ejection channel 61 in the lower surface of the actuator plate 53, and connects +Y-side end portions of the pair of common electrodes 85 to each other. Specifically, the second connection wiring part 200 is provided with a pair of lateral connection parts 200*a*, and a central connection part 200*b*.

The lateral connection parts 200*a* are respectively formed in portions which are +Y-side end portions in the lower end opening edge of the ejection channel 61 in the lower surface of the actuator plate 53, and are located at both sides in the X direction. Each of the lateral connection parts 200*a* extends in a portion from the changing part 64 to the −Y-side end portion of the uniform part 63 in the Y direction along the lower end opening edge of the ejection channel 61. Specifically, the +Y-side end portion in the lateral connection part 200*a* is arranged at a position equivalent in the Y direction to the +Y-side end edge in the lower end opening edge of the ejection channel 61. The −Y-side end portion in the lateral connection part 200*a* reaches a position equivalent in the Y direction to the +Y-side end portion in the uniform part 63. The lateral connection part 200*a* is coupled to a portion provided to the uniform part 63 in the corresponding common electrode 85 through the lower end opening of the ejection channel 61. It should be noted that it is possible for the lateral connection part 200*a* to be coupled to a portion provided to the changing part 64 (the decreasing part 64*a*) in the common electrode 85. Further, it is possible for the extraction part 86*a* to be terminated at the +Y side with respect to the uniform part 63.

The central connection part 200*b* is formed in a portion located at the +Y side with respect to the lower end opening of the ejection channel 61 in the lower surface of the actuator plate 53. The central connection part 200*b* connects the pair of lateral connection parts 200*a* to each other. In the illustrated example, the −Y-side end portions of the central connection part 200*b* reach the +Y-side end edge in the lower end opening of the ejection channel 61. It should be noted that the central connection part 200*b* is not required to directly be coupled to the common electrode 85.

In the second embodiment, there is adopted the configuration in which the first connection wiring part 86 is disposed at the −Y side of the common electrode 85, and the second connection wiring part 200 is disposed at the +Y side.

According to this configuration, even when a broken line supposedly occurs between one of the common electrodes 85 and the extraction part 86*a* corresponding to the one of the common electrodes 85, since the second connection wiring part 200 and both of the common electrodes 85 are coupled to each other, the conduction between both of the common electrodes 85 and the first connection wiring part 86 can be ensured via the second connection wiring part 200. Thus, it is possible to improve the operation reliability and the durability of the head chip 50.

Third Embodiment

Figure 27:
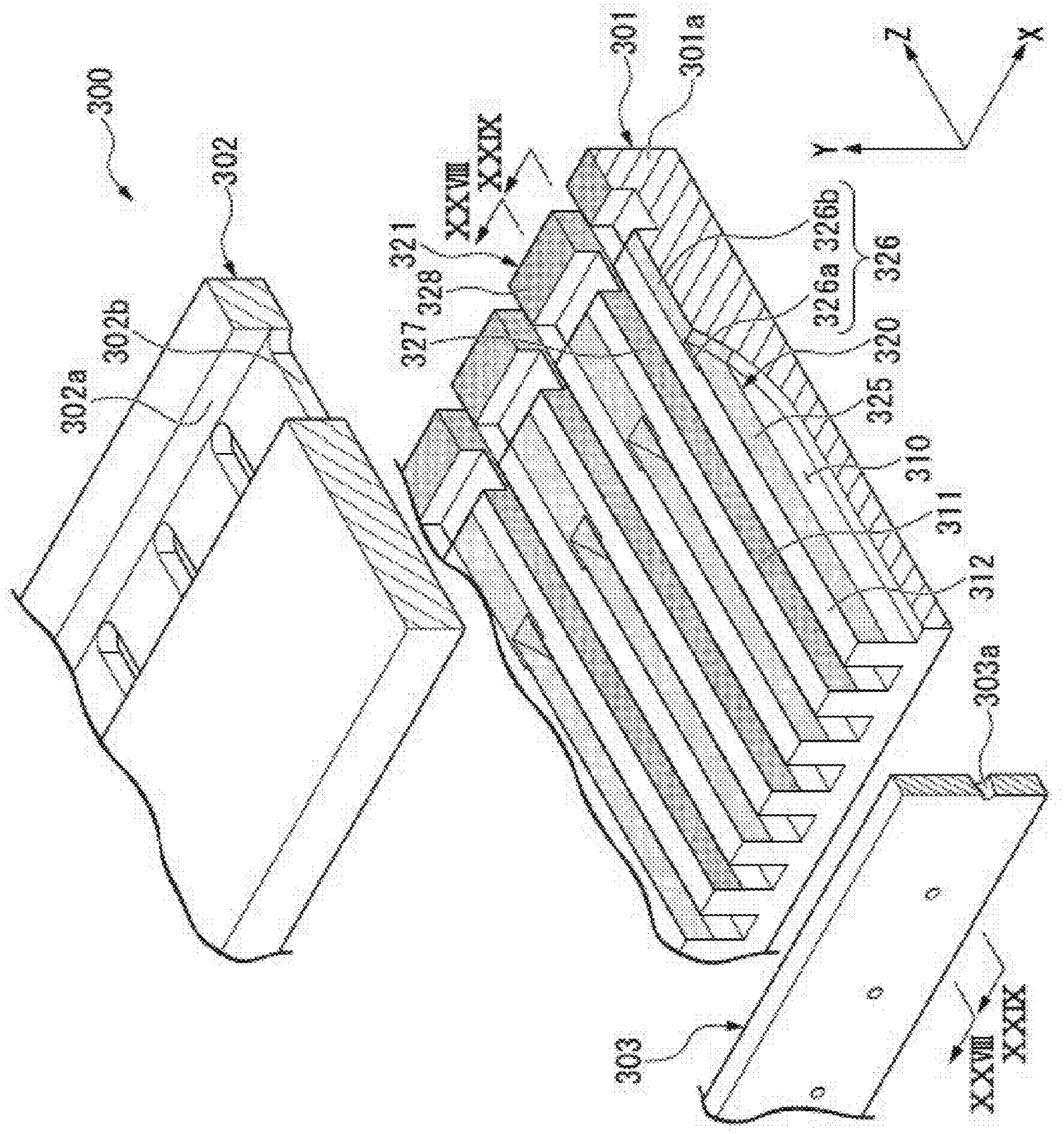
FIG. 27 is an exploded perspective view of a head chip according to a third embodiment.

FIG. 27 is an exploded perspective view of a head chip 300 according to a third embodiment. The third embodiment is different from the embodiments described above in the point that a so-called edge-shoot type head chip 300 for ejecting the ink from an end portion in the extending direction in an ejection channel 310 is adopted in the third embodiment.

The head chip 300 shown in FIG. 27 is provided with an actuator plate 301, a cover plate 302, and a nozzle plate 303.

The actuator plate 301 is arranged setting the Y direction as the thickness direction. In the following description, the +Y side is defined as an obverse surface side, and the −Y side is referred to as a reverse surface side in some cases.

The actuator plate 301 is provided with ejection channels 310 and non-ejection channels 311. The ejection channels 310 and the non-ejection channels 311 are alternately arranged along the X direction across the drive walls 312.

Figure 28:
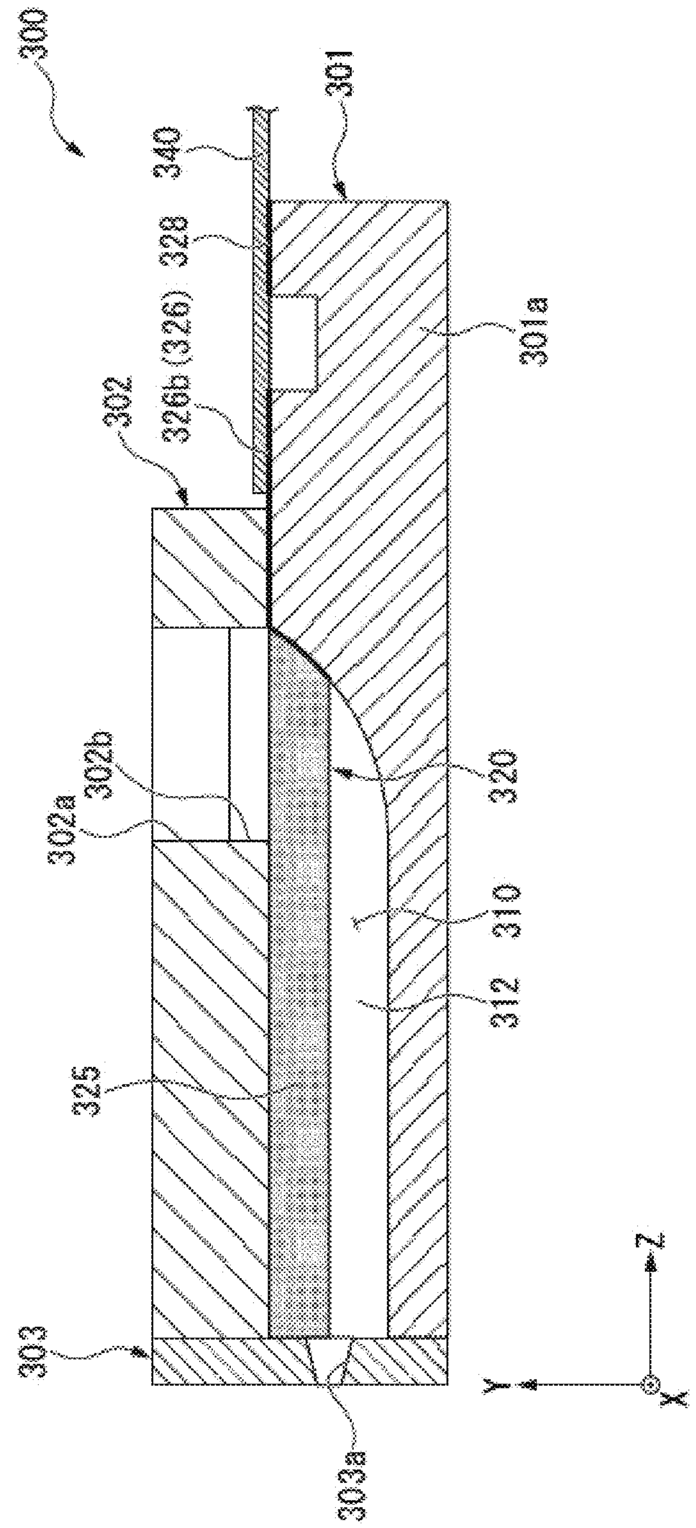
FIG. 28 is a cross-sectional view corresponding to the line XXVIII-XXVIII shown in FIG. 26.

FIG. 28 is a cross-sectional view corresponding to the line XXVIII-XXVIII shown in FIG. 27.

As shown in FIG. 28, the ejection channel 310 opens on the lower end surface of the actuator plate 301, and at the same time, extends in the Z direction. The upper end portion of the ejection channel 310 is formed to have a circular arc shape in which the depth of the ejection channel 310 gradually decreases in an upward direction.

Figure 29:
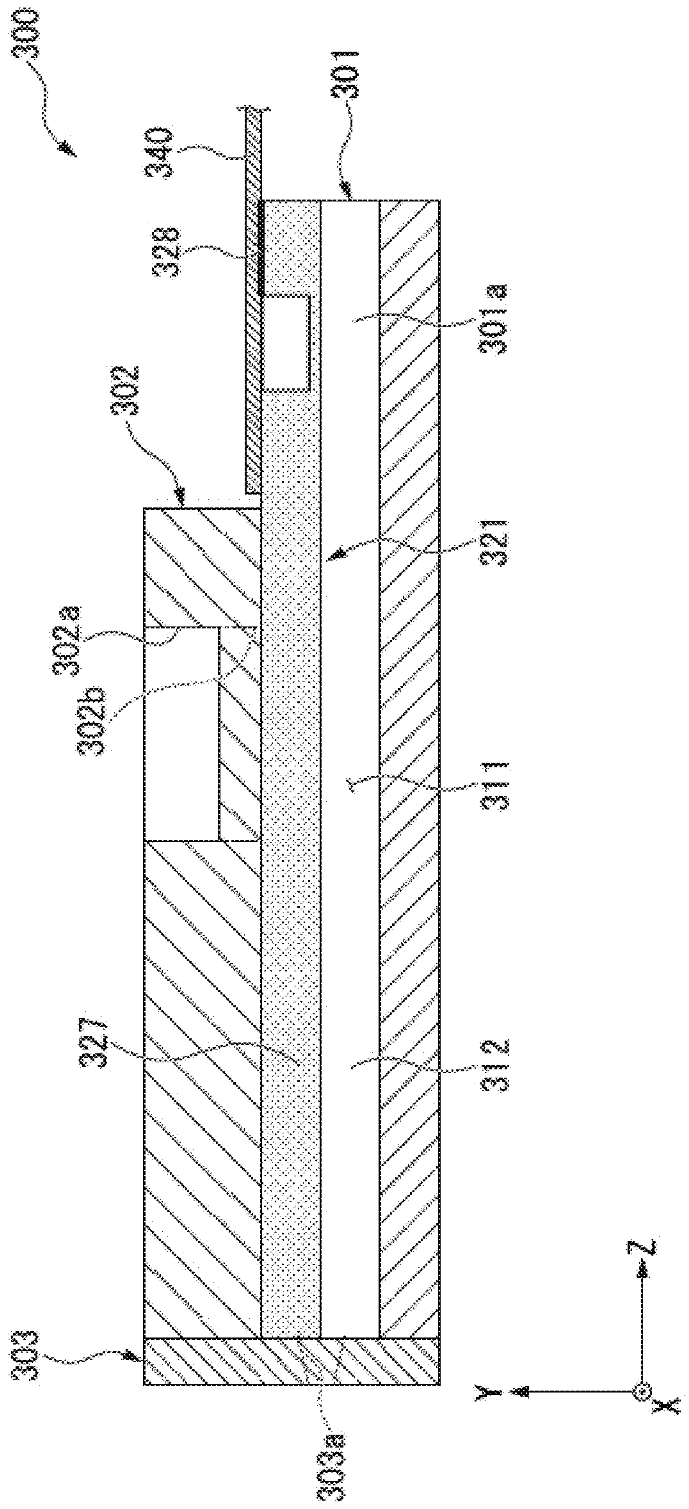
FIG. 29 is a cross-sectional view corresponding to the line XXIX-XXIX shown in FIG. 26.

FIG. 29 is a cross-sectional view corresponding to the line XXIX-XXIX shown in FIG. 26.

As shown in FIG. 29, the non-ejection channel 311 penetrates the actuator plate 301 in the Z direction. The depth of the non-ejection channel 311 is made uniform in the entire area in the Z direction.

As shown in FIG. 27, the cover plate 302 is bonded to the surface of the actuator plate 301. The cover plate 302 closes the obverse surface-side openings of the respective channels 310, 311 in a state of projecting an upper end portion (hereinafter referred to as a tail part 301*a*) of the actuator plate 301.

In the cover plate 302, at a position overlapping the upper end portion of the ejection channel 310 when viewed from the Y direction, there is formed a common ink chamber 302*a*. The common ink chamber 302*a* extends in the X direction with a length sufficient for straddling, for example, the channels 310, 311, and at the same time, opens on the obverse surface of the cover plate 302.

In the common ink chamber 302*a*, at positions overlapping the respective ejection channels 310 when viewed from the Y direction, there are formed slits 302*b*. The slits 302*b* each communicate the upper end portion of corresponding one of the ejection channels 310 and the inside of the common ink chamber 302*a* with each other. The slits 302*b* are communicated with the respective ejection channels 310 on the one hand, but are not communicated with the non-ejection channels 311 on the other hand.

The nozzle plate 303 is bonded to a lower end surface of the actuator plate 301. The nozzle plate 303 is provided with nozzle holes 303*a*. The nozzle holes 303*a* are separately formed from each other at positions opposed in the Z direction to the respective ejection channels 310 in the nozzle plate 303.

Figure 30:
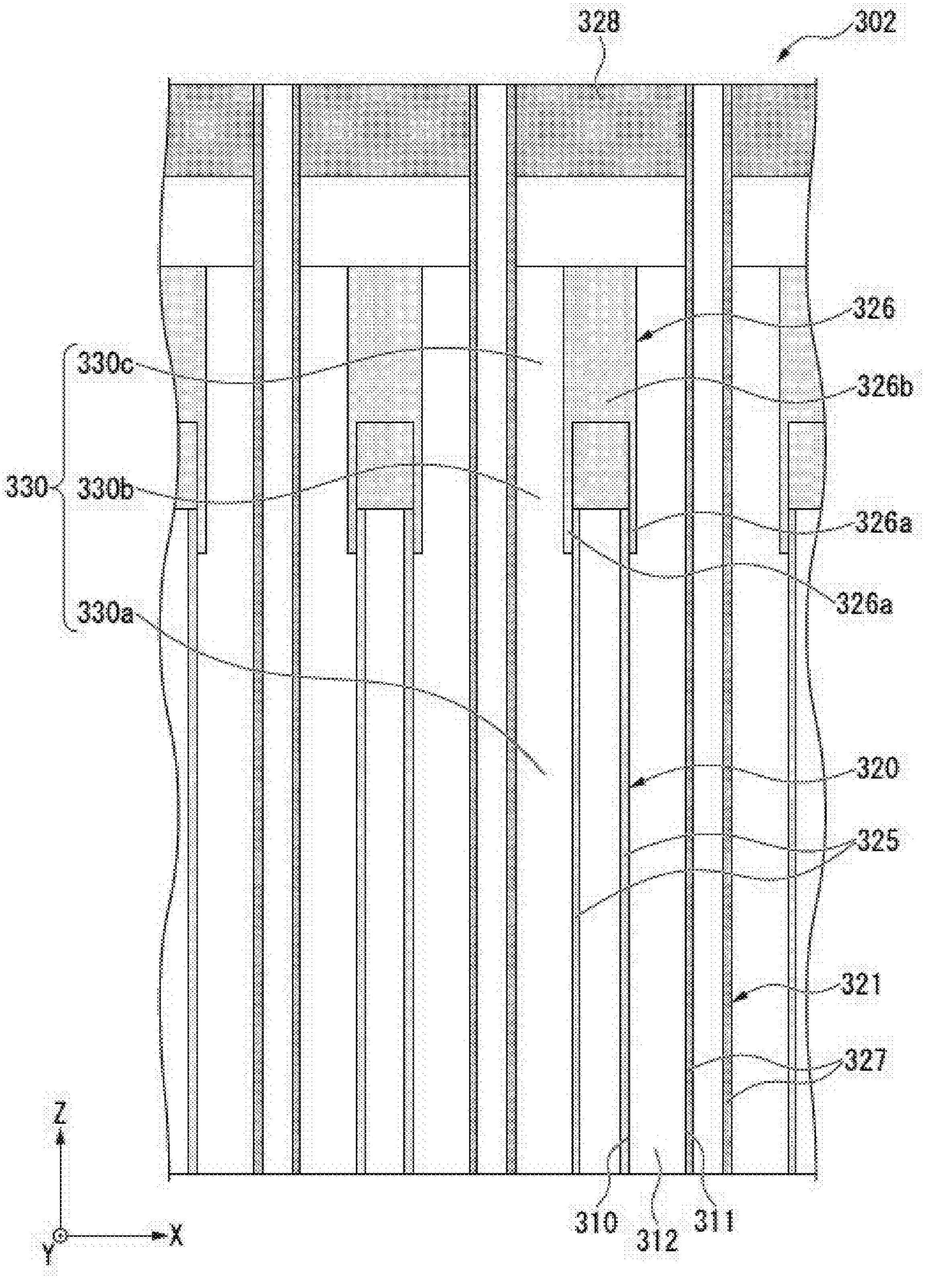
FIG. 30 is a plan view of an actuator plate according to the third embodiment.

FIG. 30 is a plan view of the actuator plate 301.

As shown in FIG. 30, the actuator plate 301 is provided with common wiring 320 and individual wiring 321. As shown in FIG. 27 and FIG. 29, the common wiring 320 is provided with common electrodes 325 and connection wiring part 326.

The common electrodes 325 are each formed on an inner side surface of each of the ejection channels 310.

The connection wiring part 326 is provided with extraction parts 326*a* and a common terminal 326*b*.

The extraction parts 326*a* are formed on the surface of the actuator plate 301. Specifically, the extraction parts 326*a* are respectively formed at both sides in the X direction with respect to the upper end portion of the obverse surface-side opening of the ejection channel 310 in the surface of the actuator plate 301. The lower end portion of the extraction part 326*a* is arranged at a position equivalent in the Z direction to the upper end edge in the obverse surface-side opening of the ejection channel 310. The lower end portion in the extraction part 326*a* is formed at a position overlapping the upper end portion of the common electrode 85 in the Z direction. The extraction parts 326*a* are coupled to the corresponding common electrode 85 through the obverse surface-side opening of the ejection channel 310.

The common terminal 326*b* is formed in a portion (the tail part 301*a*) located above the ejection channel 310 on the surface of the actuator plate 301. The lower end portion of the common terminal 326*b* is coupled to the upper end portions of the extraction parts 326*a* in the obverse surface-side opening edge in the ejection channel 310. It should be noted that the connection wiring part 326 can be provided with a configuration in which the extraction parts 326*a* are not provided, but the common terminal 326*b* alone is coupled to the common terminal 325.

As shown in FIG. 29 and FIG. 30, the individual wiring 321 is provided with individual electrodes 327, and an individual terminal 328.

The individual electrodes 327 are each formed on an inner side surface of each of the non-ejection channels 311.

The individual terminal 328 is formed in a portion located above the common terminal 326*b* on the surface of the actuator plate 301. The individual terminal 328 couples the individual electrodes 327 of the non-ejection channel 311 to each other across the ejection channel 310 from each other in the X direction.

To the surface of the tail part 301*a*, there is pressure-bonded a flexible printed board 340. The flexible printed board 340 is coupled to the common terminals 326*b* and the individual terminals 328 on the surface of the tail part 301*a*.

Here, on the surface of the actuator plate 301, there is disposed a blank area 330. The blank area 330 is formed of the plurality of laser irradiation scars (see, e.g., FIG. 9). In the present embodiment, the blank area 330 is provided with a first removal area (an electrical conducting material removal area) 330*a*, a second removal area 330*b*, and a third removal area 330*c*.

The first removal area 330*a* is an area located at both sides in the X direction with respect to the obverse surface-side opening of the ejection channel 310 on the surface of the actuator plate 301. Specifically, the first removal area 330*a* is formed throughout the entire area in the X direction in a portion located between the obverse surface-side opening (the first opening) of the ejection channel 310 and the obverse surface-side opening (the second opening) of the non-ejection channel 311 in an area (an area from a central portion of the channels 310, 311 to the lower end portion) below the extraction parts 326*a*. In other words, in the portion located between the obverse surface-side opening of the ejection channel 310 and the obverse surface-side opening of the non-ejection channel 311 in the area below the extraction parts 326*a*, the surface of the actuator plate 301 is exposed throughout the entire area.

The second removal area 330*b* is a portion located at both sides in the X direction with respect to the extraction part 326*a* in the area located between the obverse surface-side opening of the ejection channel 310 and the obverse surface-side opening of the non-ejection channel 311. The second removal area 330*b* is connected at the upper side of the first removal area 330*a*. In the second removal area 330*b*, the surface of the actuator plate 301 is exposed in the portion located between the extraction part 326*a* and the lower end opening of the non-ejection channel 311.

The third removal area 330*c* is an area located in the tail part 301*a* on the surface of the actuator plate 301. The third removal area 330*c* is connected at the upper side of the second removal area 330*b*. The second removal area 330*b* is formed throughout the entire area in the X direction in a portion located between the common terminal 326*b* and the obverse surface-side opening of the non-ejection channel 311.

Other Modified Examples

It should be noted that the scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet head moves with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is described the configuration in which the Z direction coincides with the gravitational direction, but this configuration is not a limitation, and it is also possible to set the Z direction to a direction along the horizontal direction.

In the embodiments described above, there is explained the configuration (so-called pulling-shoot) of deforming the actuator plate in the direction of increasing the volume of the ejection channel due to the application of the voltage, and then restoring the actuator plate to thereby eject the ink, but this configuration is not a limitation. It is possible for the head chip according to the present disclosure to be provided with a configuration (so-called pushing-shoot) in which the ink is ejected by deforming the actuator plate in a direction of reducing the volume of the ejection channel due to the application of the voltage. When performing the pushing-shoot, the actuator plate deforms so as to bulge toward the inside of the ejection channel due to the application of the drive voltage. Thus, the volume in the ejection channel decreases to increase the pressure in the ejection channel, and thus, the ink located in the ejection channel is ejected outside through the nozzle hole. When setting the drive voltage to zero, the actuator plate is restored. As a result, the volume in the ejection channel is restored.

Besides the above, it is arbitrarily possible to replace the constituents in the embodiments described above with known constituents within the scope or the spirit of the present disclosure, and it is also possible to arbitrarily combine the modified examples described above with each other.

What is claimed is:

1. A head chip comprising:

an actuator plate in which jet channels to be filled with liquid and non-jet channels not to be filled with the liquid each extend in a first direction, and are alternately formed in a second direction crossing the first direction across each of drive walls;

a first electrode formed on an inner surface of the jet channel; and a second electrode formed on an inner surface of the non-jet channel, wherein in the actuator plate, on a first principal surface facing to one side in a third direction crossing the second direction when viewed from the first direction, in a portion located between a first opening which opens on the first principal surface in the jet channel and a second opening which opens on the first principal surface in the non-jet channel, an electrical conducting material removal area in which a laser irradiation scar is formed throughout an entire area in the second direction between the first opening and the second opening is disposed, and further wherein the electrical conducting material removal area is formed in at least a portion located between a central portion in the first direction of the jet channel and a central portion in the first direction of the non-jet channel on the first principal surface, in the first principal surface, in a circumferential edge portion located in a first side end portion in the first direction in the first opening, a first wiring part to be coupled to the first electrode through the first opening is formed, and the first wiring part includes:

a pair of first lateral connection parts arranged at both sides in the second direction with respect to the first opening, and a terminal part which couples the pair of first lateral connection parts to each other, and which is coupled to an external wiring.

2. The head chip according to claim 1, wherein the first electrode includes a side surface part formed on inner side surfaces opposed to each other in the second direction in the jet channel, the jet channel includes an uprise part gradually decreasing in dimension in the first direction toward one side in the third direction when viewed from the second direction, and the first wiring part is coupled to the side surface part via the first lateral connection part.

3. The head chip according to claim 1, wherein the jet channel includes a decreasing part decreasing in distance between inner side surfaces opposed to each other in the second direction in a direction toward the first opening when viewed from the first direction, and a uniform part which is connected at a second side as an opposite side to a first side in the first direction to the decreasing part, and which is uniform in distance between inner side surfaces opposed to each other in the second direction, and the first lateral connection part extends to a position overlapping the uniform part in the first direction, and is coupled to a portion provided to the uniform part in the first electrode.

4. The head chip according to claim 1, wherein in the first principal surface, in a circumferential edge portion located in a second side end portion in the first direction in the first opening, a second wiring part to be coupled to the first electrode through the first opening is formed, and the second wiring part includes a pair of second lateral connection parts arranged at both sides in the second direction with respect to the first opening, and a central connection part configured to connect the pair of second lateral connection parts to each other.

5. The head chip according to claim 1, wherein a bonding member is bonded to the first principal surface via an adhesive, and a first bonding film which is higher in bonding force with the first principal surface compared to a bonding force between the first principal surface and the adhesive intervenes between the first principal surface and the adhesive.

6. The head chip according to claim 1, further comprising a protective film which has insulating property and which is disposed so as to cover the first principal surface, wherein a second bonding film which is higher in bonding force with the first principal surface compared to a bonding force between the first principal surface and the protective film intervenes between the first principal surface and the protective film.

7. A liquid jet head comprising the head chip according to claim 1.

8. A liquid jet recording device comprising the liquid jet head according to claim 7.

* * * * *